US010360527B2

(12) United States Patent
Abe et al.

(10) Patent No.: US 10,360,527 B2
(45) Date of Patent: Jul. 23, 2019

(54) CASUAL MODELING OF MULTI-DIMENSIONAL HIERARCHICAL METRIC CUBES

(75) Inventors: Naoki Abe, Rye, NY (US); Jing Fu, Yorktown Heights, NY (US); Michael G. Gemmell, Saint John (CA); Shubir Kapoor, Shrub Oak, NY (US); Floyd S. Kelly, Osgoode (CA); David M. Loehr, Ottawa (CA); Aurelie C. Lozano, Scarsdale, NY (US); Shilpa N. Mahatma, Mohegan Lake, NY (US); Bonnie K. Ray, Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 12/943,316

(22) Filed: Nov. 10, 2010

(65) Prior Publication Data

US 2012/0116850 A1    May 10, 2012

(51) Int. Cl.
*G06Q 10/06* (2012.01)
(52) U.S. Cl.
CPC ....... *G06Q 10/067* (2013.01); *G06Q 10/0639* (2013.01); *G06Q 10/063* (2013.01)
(58) Field of Classification Search
CPC . G06Q 10/067; G06Q 10/0639; G06Q 10/063
USPC ...................................... 705/7.11, 348, 7.38
See application file for complete search history.

(56) References Cited

U.S. PATENT DOCUMENTS

| 5,640,491 | A | 6/1997 | Bhat et al. |
| 6,336,108 | B1 * | 1/2002 | Thiesson et al. ............... 706/20 |
| 6,415,276 | B1 * | 7/2002 | Heger et al. .................... 706/52 |
| 6,633,882 | B1 * | 10/2003 | Fayyad et al. |
| 7,072,899 | B2 * | 7/2006 | Lokken |
| 7,389,208 | B1 * | 6/2008 | Solinsky .............. G06K 9/6232 382/115 |
| 7,392,157 | B1 | 6/2008 | Delurgio et al. |
| 7,702,615 | B1 * | 4/2010 | Delurgio et al. ............. 707/781 |

(Continued)

OTHER PUBLICATIONS

Multidimensional database technology, TB Pedersen, CS Jensen, Published in: Computer (vol. 34, Issue: 12, Dec. 2001), pp. 40-46, Date of Publication: Dec. 2001 (Year: 2001).*

(Continued)

*Primary Examiner* — Timothy Padot
*Assistant Examiner* — Darlene Garcia-Guerra
(74) *Attorney, Agent, or Firm* — Scully, Scott, Murphy & Presser, P.C.; Daniel P. Morris, Esq.

(57) ABSTRACT

A computing system initializes a first frontier to be a root of a multi-dimensional hierarchical data structure representing an entity. The system acquires first data corresponding to the first frontier. The system performs modeling on the first data to obtain a first model and a corresponding first statistic. The system expands a dimension of the first frontier. The system gathers second data corresponding to the expanded frontier. The system applies the data modeling on the second data to obtain a second model and a corresponding second statistic. The system compares the first statistic of the first model and the second statistic of the second model. The system sets the second model to be the first model in response to determining that the second model statistic is better than the first model statistic. The system outputs the first model.

24 Claims, 14 Drawing Sheets

(56) References Cited

U.S. PATENT DOCUMENTS

| | | | |
|---|---|---|---|
| 8,255,346 | B2 | 8/2012 | Abe et al. |
| 8,321,262 | B1* | 11/2012 | Wen .................. G06Q 30/0283 705/36 R |
| 2003/0014379 | A1* | 1/2003 | Saias ...................... G06Q 10/06 706/45 |
| 2003/0144746 | A1* | 7/2003 | Hsiung et al. .................. 700/28 |
| 2004/0006566 | A1* | 1/2004 | Taylor et al. ................. 707/100 |
| 2004/0199445 | A1* | 10/2004 | Eder ...................... G06Q 40/00 705/35 |
| 2005/0065910 | A1* | 3/2005 | Welton .............. G06F 17/30489 |
| 2005/0234718 | A1 | 10/2005 | Ouimet et al. |
| 2006/0095282 | A1* | 5/2006 | Belmonte .............. G06Q 10/00 715/219 |
| 2006/0111993 | A1* | 5/2006 | Lawrence .............. G06Q 10/10 705/35 |
| 2006/0224534 | A1 | 10/2006 | Hartman et al. |
| 2006/0288046 | A1* | 12/2006 | Gupta et al. .................. 707/200 |
| 2007/0112607 | A1* | 5/2007 | Tien et al. ......................... 705/7 |
| 2007/0226099 | A1* | 9/2007 | Senturk-Doganaksoy et al. ......... 705/35 |
| 2008/0183311 | A1* | 7/2008 | MacArthur ............ G05B 17/02 700/29 |
| 2008/0215386 | A1* | 9/2008 | Eder ...................... G06Q 10/06 705/7.11 |
| 2008/0249957 | A1* | 10/2008 | Masuyama ............ G06Q 40/00 705/36 R |
| 2008/0262900 | A1* | 10/2008 | Duffy et al. ..................... 705/10 |
| 2008/0275890 | A1* | 11/2008 | Chakrabarti et al. ......... 707/100 |
| 2009/0018996 | A1* | 1/2009 | Hunt et al. ......................... 707/2 |
| 2009/0030915 | A1* | 1/2009 | Winter et al. .................. 707/100 |
| 2009/0112927 | A1* | 4/2009 | Chitnis et al. ............. 707/104.1 |
| 2009/0210081 | A1* | 8/2009 | Sustaeta ............. G05B 13/0285 700/99 |
| 2010/0114658 | A1* | 5/2010 | Drew ............... G06Q 10/06393 705/7.39 |
| 2011/0054860 | A1* | 3/2011 | Guild et al. ....................... 703/2 |
| 2011/0131173 | A1* | 6/2011 | Fernandez Ortega ........ 707/602 |
| 2011/0167015 | A1* | 7/2011 | Smith .................. G06Q 10/067 705/348 |
| 2011/0208562 | A1* | 8/2011 | Hartley et al. ............... 705/7.33 |
| 2012/0046929 | A1* | 2/2012 | Joshi ................... G06F 17/5022 703/13 |
| 2012/0137367 | A1* | 5/2012 | Dupont et al. .................. 726/25 |

OTHER PUBLICATIONS

Casella, G., et al., "Solutions Manual for Statistical Inference, Second Edition", Dec. 2001, http://www.exampleproblems.com/Solutions-Casella-Berger.pdf.

Chen, Y., et al., "Regression Cubes with Lossless Compression and Aggregation", IEEE Transactions on Knowledge and Data Engineering, Dec. 2006, pp. 1585-1599, vol. 18, No. 12.

Chen, B. C., et al., "Prediction Cubes", Proceedings of the 31st VLDB Conference, 2005, Trondheim, Norway, pp. 982-993.

Margaritis, D., et al., "NetCube: A Scalable Tool for Fast Data Mining and Compression", Proceedings of the 27th VLDB Conference, 2001, Roma, Italy.

Baillie, R. T., "The Asymptotic Mean Squared Error of Multistep Prediction from the Regression Model with Autoregressive Errors", Journal of the American Statistical Association, Theory and Methods Section, Mar. 1979, vol. 74, No. 365.

Agnew, D. C., et al., "Chapter 7: Least Squares Estimation", 2004, pp. 7-1-7-11, Version 1.1, University of California San Diego.

Ke, Q., et al., "Robust Subspace Computation Using L1 Norm", Tech. Report CMU-CS-03-172, Aug. 2003, Computer Science Department, Carnegie Mellon University.

Arnold, A., et al., "Temporal Causal Modeling with Graphical Granger Methods", KDD '07 Proceedings of the 13th ACM SIGKDD international conference on Knowledge discovery and data mining, Aug. 12-15, 2007, San Jose, CA.

Caron, E. A. M., et al., "Explanation of exceptional values in multidimensional business databases", International Conference on Industrial Engineering and Systems Management, IESM 2007, May 30-Jun. 2, 2007, Beijing, China.

Xi, R., et al., "Compression and Aggregation for Logistic Regression Analysis in Data Cubes", IEEE Transactions on Knowledge and Data Engineering, Aug. 2008, pp. 1-14, vol. 1, No. 1.

Ben-Gal, I., et al., "Bayesian Networks", Encyclopedia of Statistics in Quality & Reliability, 2007, Wiley & Sons.

Caron, E., et al., "Automated detection and explanation of exceptional values in a datamining environment", Computing in Economics and Finance 2005 from Society for Computational Economics, No. 469.

Chen, Y., et al., "Multi-Dimensional Regression Analysis of Time-Series Data Streams," Proceedings of the 28th VLDB Conference, 2002, Hong Kong, China.

Abdi, H., "Experimental Design & Analysis for Psychology", Chapter 2: Correlation, Feb. 26, 2009, Oxford University Press, http://www.oup.com/uk/orc/bin/9780199299881/ch02.pdf.

Shalizi, C., "Lecture 10: Regression Trees", 36-350 Data Mining, Oct. 11, 2006, http://www.stat.cmu.edu/~cshalizi/350-2006/lecture-10.pdf.

Yuan et al., "Model selection and estimation in regression with grouped variablles", J.R. Statist. Soc. B, 68, Part 1, pp. 49-67, 2006.

Granger, "Investigating Causal Relations by Econometric Models and Cross-spectral Methods", Economitrica vol. 37, No. 3 (Aug. 1969), pp. 424-438.

Sambo et al., "CNET: an algorithm for Reverse Engineering of Casual Gene Networks", Bioinfomatics Methods for Biomedical Complex Systems Applications, 8th workshop on Network Tools and Applications in Biology NETTAB2008, Varenna, Italy.

Whitfield et al., "Identification of Genes Periodically Expressed in the Human Cell Cycle and Their Expression in Tumors", Molecular Biology of the Cell, vol. 13, pp. 1977-2000, Jun. 2002.

Tibshirani, "Regression Shrinkage and Selection via the Lasso", Journal of the Royal Statistical Society, Series B (Methodological) vol. 58, No. 1, (1996), pp. 267-288.

* cited by examiner

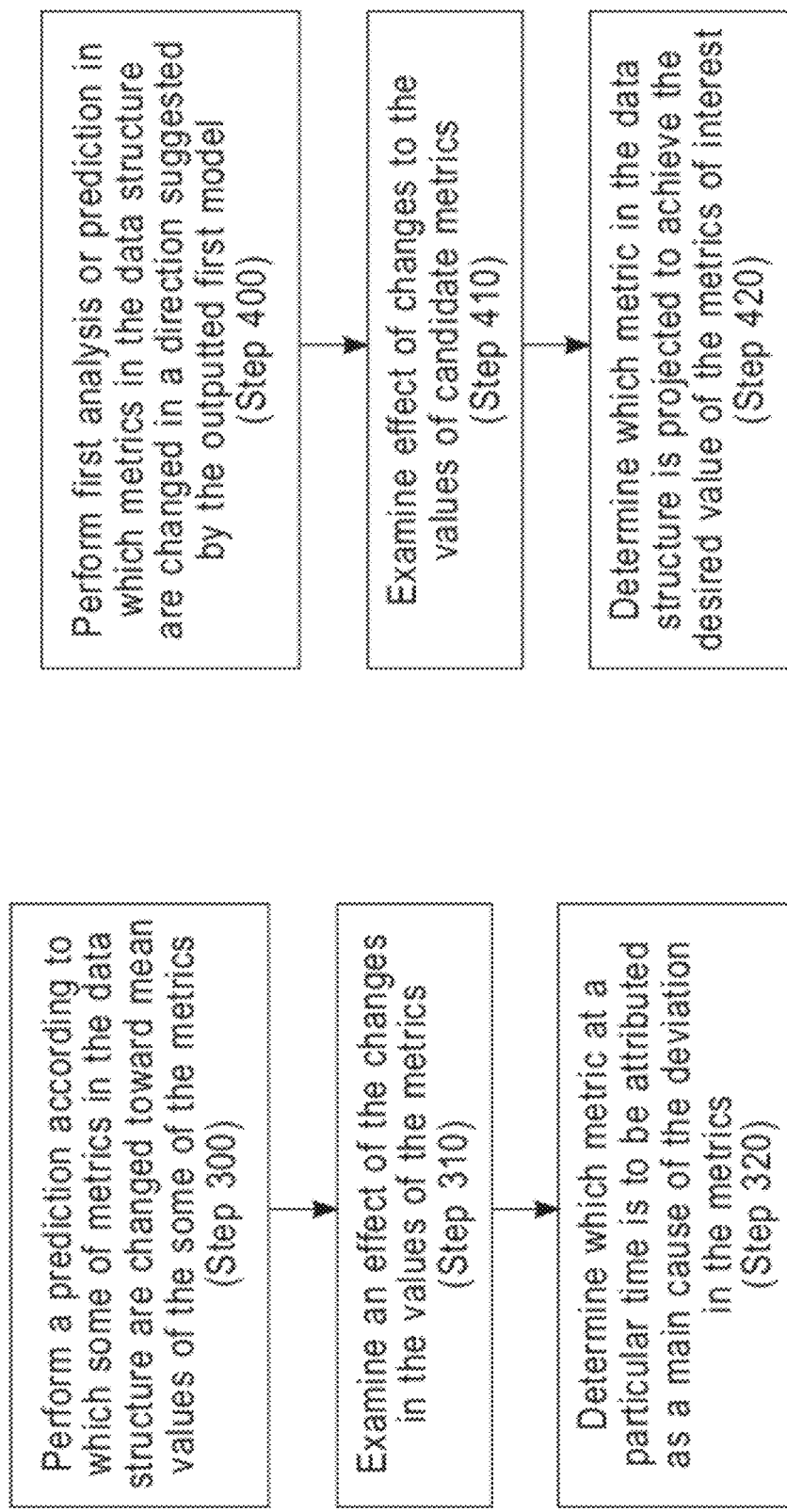

Cube Viewer: brp_demo->Metric Cube - BRP->Default

600 — Metric Cube
620, 630
610
640

| Measures | Version | Auto --Retail Debt +2007 | +2008 | --Loans +2007 | +2008 | --Term Loans +2007 | +2008 | --Mortgage Loans +2007 | +2008 | 10 Year Prime Rate Mortgage +2007 | +2008 | 20 Year Variable Rate Mortgage +2007 | +2008 |
|---|---|---|---|---|---|---|---|---|---|---|---|---|---|
| Receivables | Actual | 7713769857.39 | 10527297419.09 | 7713769857.39 | 10527297419.09 | 7713769857.39 | 10527297419.09 | 7713769857.39 | 10527297419.09 | 5214963153.82 | 5293237511.01 | 2498806503.57 | 5234659908.08 |
| Total Revenue | Actual | 24722367255.05 | 28798199811.04 | 24722367255.05 | 28798199811.04 | 24722367255.05 | 28798199811.04 | 24722367255.05 | 28798199811.04 | 13039339719.29 | 14315515981.51 | 11683027535.76 | 14482663929.53 |
| Total Expenses | Actual | 25448341361.07 | 31736599417.72 | 25448341361.07 | 31736599417.72 | 25448341361.07 | 31736599417.72 | 25448341361.07 | 31736599417.72 | 14462702798.41 | 15641183217.15 | 10985638562.66 | 16095416200.57 |
| Capital Income | Actual | 5197612194.49 | 7827199804.84 | 5197612194.49 | 7827199804.84 | 5197612194.49 | 7827199804.84 | 5197612194.49 | 7827199804.84 | 2316957256.66 | 5074343610.07 | 288065493.63 | 2753753707.77 |
| Total Assets | Actual | 18969916077515 | 20283665593053 | 18969916077515 | 20283665593053 | 18969916077515 | 20283665593053 | 18969916077515 | 20283665593053 | 9585309270024.3 | 10144653742321 | 9384606807491.7 | 10139018527332 |
| Total Liabilities | Actual | 17752961014881 | 18995187756312 | 17752961014881 | 18995187756312 | 17752961014881 | 18995187756312 | 17752961014881 | 18995187756312 | 8923922930392.6 | 9456406405261.8 | 8829036084487 | 9538782351054 |
| Interest Income | Actual | 1590397321377 | 1859118149797 | 1590397321377 | 1859118149797 | 1590397321377 | 1859118149797 | 1590397321377 | 1859118149797 | 900739905394 | 844099992887 | 659657415983 | 1015018156927 |
| Interest Expense | Actual | 1895164894057 | 2264502361375 | 1895164894057 | 2264502361375 | 1895164894057 | 2264502361375 | 1895164894057 | 2264502361375 | 1174125496109 | 1011219809065 | 721039397941 | 1253282552.5 |
| Earning Assets | Actual | 18115266341714 | 19382844649298 | 18115266341714 | 19382844649298 | 18115266341714 | 19382844649298 | 18115266341714 | 19382844649298 | 9106043606523.1 | 9649399270675.55 | 9009922535190.8 | 9733451378262.6 |
| Two Plus Gross Ch | Actual | 64444372.42 | 125718154.74 | 64444372.42 | 125718154.74 | 64444372.42 | 125718154.74 | 64444372.42 | 125718154.74 | 45422855.45 | 114743984.61 | 18021716.97 | 10074413113 |
| Gross Chargeoff C | Actual | 40177 | 34527 | 40177 | 34527 | 40177 | 34527 | 40177 | 34527 | 18300 | 20061 | 16227 | 20116 |
| Net Chargeoff Cou | Actual | 31199 | 35125 | 31199 | 35125 | 31199 | 35125 | 31199 | 35125 | 17875 | 13427 | 13324 | 21698 |
| Net Chargeoff Amo | Actual | 681903897.95 | 671966599.33 | 681903897.95 | 671966599.33 | 681903897.95 | 671966599.33 | 681903897.95 | 671966599.33 | 344185760.81 | 282610587.68 | 337718137.14 | 389356011.65 |
| Foreclosure Count | Actual | 12579 | 19046 | 12579 | 19046 | 12579 | 19046 | 12579 | 19046 | 7923 | 10543 | 4656 | 8503 |
| Repossession Cou | Actual | 10275 | 14137 | 10275 | 14137 | 10275 | 14137 | 10275 | 14137 | 7046 | 7153 | 3229 | 6984 |
| Contractual Count | Actual | 28829 | 34735 | 28829 | 34735 | 28829 | 34735 | 28829 | 34735 | 15431 | 17388 | 13398 | 17347 |
| Bankruptcy Filing A | Actual | 2075533325.23 | 1892903822.2 | 2075533325.23 | 1892903822.2 | 2075533325.23 | 1892903822.2 | 2075533325.23 | 1892903822.2 | 1055216904.5 | 869975049 | 1020316347.8 | 1025928773.2 |
| Bankruptcy Filing C | Actual | 5685 | 5428 | 5685 | 5428 | 5685 | 5428 | 5685 | 5428 | 2663 | 2666 | 2822 | 2762 |
| Recovery Amount | Actual | 266591905.69 | 342216680.22 | 266591905.69 | 342216680.22 | 266591905.69 | 342216680.22 | 266591905.69 | 342216680.22 | 135079702.56 | 224622099.32 | 131512203.13 | 117594580.9 |
| Contractual Amount | Actual | 740942478.39 | 824892897.28 | 740942478.39 | 824892897.28 | 740942478.39 | 824892897.28 | 740942478.39 | 824892897.28 | 373743772.92 | 420635182.08 | 367198705.47 | 404357715.2 |
| Foreclosure Amount | Actual | 243783652.84 | 325674354.13 | 243783652.84 | 325674354.13 | 243783652.84 | 325674354.13 | 243783652.84 | 325674354.13 | 129605125.13 | 182173540.12 | 114178527.71 | 143600814.01 |
| Repossession Amo | Actual | 169680031.55 | 226709756.31 | 169680031.55 | 226709756.31 | 169680031.55 | 226709756.31 | 169680031.55 | 226709756.31 | 97726469.06 | 117367416.13 | 71953562.49 | 109242340.18 |

FIG. 6

| Measures | Impact Index | Source Code | Source Dim | Source Mem | Source Node | Target Node | Strength | Lag | Most Important Lag | Function | Coe | Use Defined |
|---|---|---|---|---|---|---|---|---|---|---|---|---|
| Receivables | 1 | Metric Cube-BRP | Measures | New Repossession Amount | Business Unit[All].Product[All] | Business Unit[All].Product[All] | 0.565 | 2 | true | | 4353.78 | false |
| | 2 | Metric Cube-BRP | Measures | New Repossession Amount | Business Unit[All].Product[All] | Business Unit[All].Product[All] | 0.565 | 2 | true | SQUARED | 5.44 | false |
| Total Revenue | 1 | Metric Cube-BRP | Measures | New Bankruptcy Filing Amt. | Business Unit[All].Product[All] | Business Unit[All].Product[All] | 0.645 | 2 | false | | 0 | false |
| | 2 | Metric Cube-BRP | Measures | New Bankruptcy Filing Amt. | Business Unit[All].Product[All] | Business Unit[All].Product[All] | 0.645 | 2 | true | SQUARED | 0 | false |
| Total Expense | 1 | Metric Cube-BRP | Measures | New Bankruptcy Filing Amt. | Business Unit[All].Product[All] | Business Unit[All].Product[All] | 0.666 | 2 | true | | 0 | false |
| | 2 | Metric Cube-BRP | Measures | New Contractual Amount | Business Unit[All].Product[All] | Business Unit[All].Product[All] | 0.666 | 2 | true | SQUARED | 0 | false |
| Capital Income | 1 | Metric Cube-BRP | Measures | New Contractual Amount | Business Unit[All].Product[All] | Business Unit[All].Product[All] | 0.642 | 2 | true | | 0 | false |
| | 2 | Metric Cube-BRP | Measures | Capital Income | Business Unit[All].Product[All] | Business Unit[All].Product[All] | 0.642 | 2 | true | SQUARED | 0 | false |
| Total Assets | 1 | Metric Cube-BRP | Measures | Capital Income | Business Unit[All].Product[All] | Business Unit[All].Product[All] | 0.591 | 2 | true | | 0 | false |
| | 2 | Metric Cube-BRP | Measures | Bankruptcy Filing Amount | Business Unit[All].Product[All] | Business Unit[All].Product[All] | 0.591 | 2 | true | SQUARED | 0 | false |
| Total Liabilities | 1 | Metric Cube-BRP | Measures | Bankruptcy Filing Amount | Business Unit[All].Product[All] | Business Unit[All].Product[All] | 0.637 | 2 | true | | 0 | false |
| | 2 | Metric Cube-BRP | Measures | New Repossession Amount | Business Unit[All].Product[All] | Business Unit[All].Product[All] | 0.637 | 2 | true | SQUARED | 0 | false |
| Interest Income | 1 | Metric Cube-BRP | Measures | New Repossession Amount | Business Unit[All].Product[All] | Business Unit[All].Product[All] | 0.675 | 2 | true | | 0 | false |
| | 2 | Metric Cube-BRP | Measures | New Repossession Amount | Business Unit[All].Product[All] | Business Unit[All].Product[All] | 0.675 | 2 | true | SQUARED | 0 | false |
| Interest Expense | 1 | Metric Cube-BRP | Measures | New Bankruptcy Filing Amt. | Business Unit[All].Product[All] | Business Unit[All].Product[All] | 0.607 | 2 | true | | 0 | false |
| | 2 | Metric Cube-BRP | Measures | New Bankruptcy Filing Amt. | Business Unit[All].Product[All] | Business Unit[All].Product[All] | 0.607 | 2 | true | SQUARED | 0 | false |
| Earning Assets | 1 | Metric Cube-BRP | Measures | New Net Chargeoff Count | Business Unit[All].Product[All] | Business Unit[All].Product[All] | 0.715 | 2 | true | | 0 | false |
| | 2 | Metric Cube-BRP | Measures | New Net Chargeoff Count | Business Unit[All].Product[All] | Business Unit[All].Product[All] | 0.715 | 2 | true | SQUARED | 0 | false |
| Two Plus Gross | 1 | Metric Cube-BRP | Measures | Capital Income | Business Unit[All].Product[All] | Business Unit[All].Product[All] | 0.576 | 2 | true | | 0 | false |
| | 2 | Metric Cube-BRP | Measures | Capital Income | Business Unit[All].Product[All] | Business Unit[All].Product[All] | 0.576 | 2 | false | SQUARED | 0 | false |
| Gross Charged | 1 | Metric Cube-BRP | Measures | Capital Income | Business Unit[All].Product[All] | Business Unit[All].Product[All] | 0.637 | 2 | false | | 0 | false |
| | 2 | Metric Cube-BRP | Measures | Capital Income | Business Unit[All].Product[All] | Business Unit[All].Product[All] | 0.637 | 2 | false | SQUARED | 0 | false |

FIG. 7

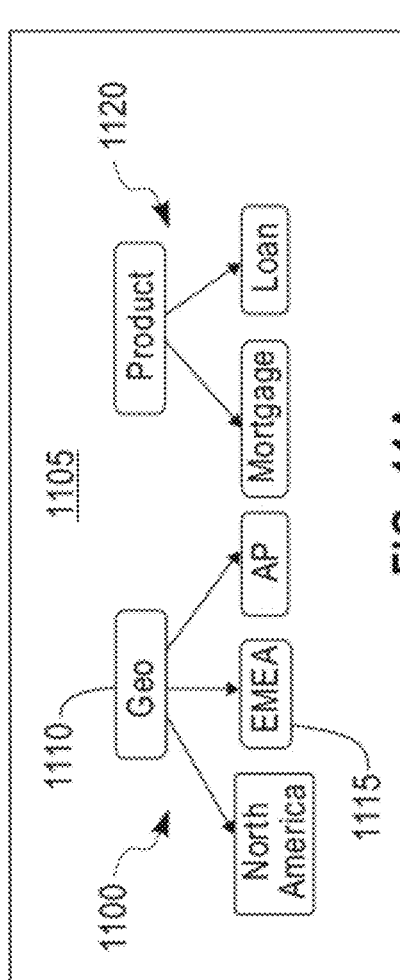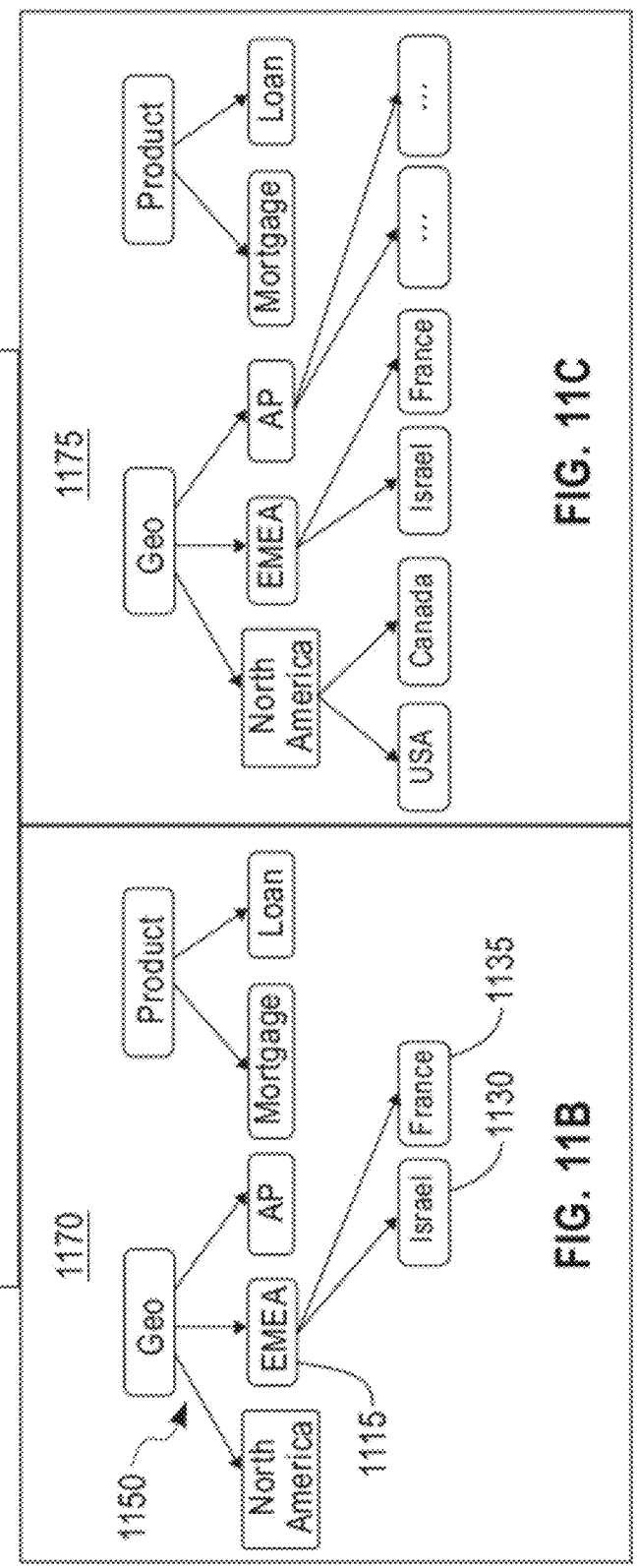

CASUAL MODELING OF MULTI-DIMENSIONAL HIERARCHICAL METRIC CUBES

BACKGROUND

The present application generally relates to managing a business organization, a business process, an industrial process or machinery, and other similar entities. More particularly, the present application relates to building of associated functions of statistical or causal models for monitoring and managing the performance of such entities by using metric data that monitor the operations of the entities.

As data storage costs decrease and automated systems increase, business organizations collect and store increasing numbers of business metrics (e.g., revenue, size of sales force, etc.) from which the business organization would like to extract an insight (e.g., an overall performance measurement or metric of the sales force). The metrics are typically collected and aggregated across multiple dimensions, e.g., geography, product line(s), business unit(s), etc. to provide different views to business users having different roles in the organization. For managing the overall performance of the business organization, business analysts have had increasing difficulty in identifying a "right" set of metrics to report, monitor, and manage. To identify the right set of metrics, the business analysts have found it useful to find out answers to the following exemplary questions: (1) At what level of a hierarchy (e.g., a tree data structure representing the taxonomy related to the organization or business process in question) are there most meaningful patterns among the metrics? (2) What are the relationships between the metrics? (3) Are relationships among the metrics similar for different categories within one or more levels of the hierarchy? (4) What may happen to the value of a certain metric of interest for a certain node in the hierarchy, if the organization managed to change the value of other metric(s)? An example of the fourth question in the context of business performance metric management may be "What may happen to total sales in USA if the organization increases sales resources only in the eastern region of USA?"

SUMMARY OF THE INVENTION

The present disclosure describes a system, method and computer program product for modeling data stored in a multi-dimensional hierarchical metric cube for managing performance of an entity. An entity herein may refer to an organization or a business process.

In one embodiment, there is provided a system for managing performance of an entity. The system comprises a memory device and a processor being connected to the memory device. The processor initializes the frontier to be the root of the multi-dimensional hierarchical data structure. Here, the frontier refers to a cut of the multi-dimensional hierarchical data structure at which modeling of the metrics is performed. The processor obtains first data corresponding to the frontier. The processor performs modeling on the first data to obtain a first model and a corresponding first statistic, also referred herein to as a model score. The processor expands one of the dimensions of the frontier to obtain a new frontier. The processor gathers second data corresponding to the expanded frontier. The processor applies the data modeling on the second data to obtain a second model and a corresponding second statistic. The processor compares the model score statistic of the first model and the model score statistic of the second model. The processor sets the second model to be the first model in response to determining that the second model score statistic is better than the first model score statistic, and iterates the whole process, going back to the point prior to obtaining a new frontier. If the second model score statistic is not better than that of the first model, then if there remain some dimensions of the frontier whose expansion have not yet been considered by the processor, then the processor goes back to the point prior to obtaining the new frontier, expands one of the dimensions that have not yet been considered, and iterates the whole process. Otherwise, the processor outputs the first model, and terminates.

In a further embodiment, the modeling includes one or more of: probabilistic graphical modeling, least square estimation method, graphical Granger modeling method, and generalized linear modeling method.

In a further embodiment, to acquire the first data, the processor aggregates data corresponding to nodes in a dimension of the hierarchical data structure.

In a further embodiment, to acquire the first data, the processor constructs separate models corresponding to distinct nodes in one or more dimensions of the hierarchical data structure.

In a further embodiment, to perform the model comparison, the processor calculates, as the first and second model score statistics, respective predictive squared error means of the first model and the second model, and compares the calculated predictive squared error means to determine whether the second model score statistic is less than the first model score statistic.

In a further embodiment, the processor analyzes the outputted first model based on a first analysis, referred to herein as what-if scenario analysis. The first analysis includes: (1) optionally setting values of a set of metrics in the outputted first model, referred to as scenario metrics, to new values; (2) optionally allocating or aggregating the first data to obtain the second data; (3) performing a prediction (i.e., a forecasting) on the values of metrics by using the outputted first model and the optionally set values; and (4) allocating or aggregating predicted values at a level lower or higher than the new frontier to obtain predicted values at all levels of the hierarchy (i.e., output of this first analysis). In case the set of scenario metrics is empty, the first analysis is equivalent to performing a prediction on a set of metrics in the outputted first model with the values of the scenario metrics equal to their values in the first data. Values of the metrics for future points in time are predicted.

In a further embodiment, the processor analyzes the outputted first model based on a second analysis, referred to herein as root cause analysis. The second analysis includes: (1) performing a prediction according to which some of the metrics in the data structure are changed towards mean values of the some of the metrics; (2) examining an effect of the changes in the values of the metrics; and (3) determining which metric at a particular time is to be attributed as a main cause of the deviation in the metrics by identifying which metrics result in returning the value of the metrics to a normal value range with minimal changes to the value.

In a further embodiment, the processor analyzes the outputted first model based on a third analysis, referred to herein as goal seek analysis. The third analysis includes: (1) performing a prediction, in which metrics in the data structure are changed in a direction suggested by the output model; (2) examining the effect of said changes to the values of the candidate metrics; and (3) determining which metric in the data structure is projected to achieve the desired value of the metric of interest, with minimal changes to the values of the candidate metrics.

In a further embodiment, the processor calculates causal strength of causal relations identified between metrics by the frontier in the outputted first model and further calculates the causal strength of the relationships between the metrics at different cuts in the multi-dimensional hierarchy based on the causal strength at the frontier.

BRIEF DESCRIPTION OF THE DRAWINGS

The accompanying drawings are included to provide a further understanding of the present invention, and are incorporated in and constitute a part of this specification.

FIG. 3 illustrates a flow chart illustrating method steps for a second analysis in one embodiment.

FIG. 4 illustrates a flow chart illustrating method steps for a third analysis in one embodiment.

FIG. 6 illustrates an exemplary Metric Cube in one embodiment.

FIG. 7 illustrates an exemplary Impact Cube in one embodiment.

FIGS. 11a-11c illustrate expanding a dimension in an exemplary multi-dimensional hierarchical data structure in one embodiment.

DETAILED DESCRIPTION

Figure 9A:
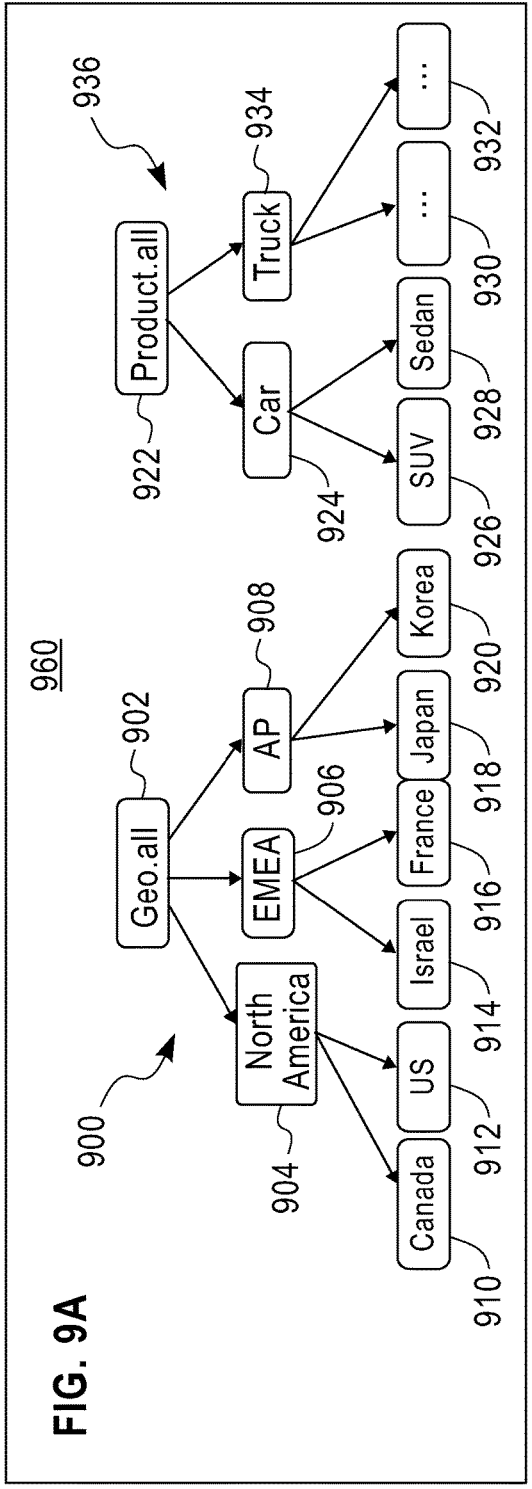
FIGS. 9a-9f illustrate exemplary constraints imposed between metrics in one embodiment.

In one embodiment, the system and method for managing performance of an entity include, but are not limited to, a construction of a "graphical model" or a "causal graph" (e.g., a data structure 960 in FIG. 9a) that includes metrics (e.g., nodes in FIG. 9a) and their relationships (e.g., edges in FIG. 9a). A causal graph is a graph that includes nodes, which represent metrics, and edges between the nodes. An edge in a causal graph represents the presence of a directed relationship, optionally with an associated quantity referred to herein as "causal strength". A causal strength may represent the degree to which a node affects another node. Normally, a node and its associated metric at the source of the edge are referred to as a "source", "cause" or "parent". A node and its associated metric at the other end of the edge are referred to as a "target", "effect" or "child". A graphical model comprises a causal graph (i.e., a graph that captures relationships between the cause(s) and the effect(s)) and a statistical model of conditional probability density associated with each edge in the graph. Hence, in a graphical model, a relationship between two metrics is a statistical relationship. The metrics may include, but are not limited to: sales, customer satisfaction, return on investment, revenue, etc., which are associated with the entity. A dimension (i.e., a tree data structure 900 in FIG. 9a) of a multi-dimensional data store may include, but is not limited to: geography, product line(s) and line(s) of business. A dimension of the multi-dimensional data store may be equipped with a hierarchical taxonomy tree that includes, but is not limited to: geographical regions, product lines, product categories, machine categories, etc. The data stored in a multi-dimensional data store may be represented in a multi-dimensional hierarchical structure (i.e., a data structure having one or more dimensions) as shown in FIG. 9a. In one embodiment, a data structure 960 in FIG. 9a is an example of the multi-dimensional hierarchical data structure including, without limitation, the dimensions: a tree data structure 900 and another tree data structure 936. A tree data structure (e.g., a tree data structure 900 in FIG. 9a) may correspond to a single dimension.

A computer system (e.g., a computer system 800 in FIG. 8) constructs the causal graph and optionally an associated graphical model, e.g., by using a data modeling method (e.g., Bayesian Network learning method, Least Square estimation method, graphical Granger modeling method, dynamic Bayesian network learning based on time series data, etc.), so that relationships between metrics are identified at a "frontier" level of a multi-dimensional hierarchical data structure. Ben-Gal I., etc., "Bayesian Networks," Encyclopedia of Statistics in Quality & Reliability, Wiley & Sons, 2007, wholly incorporated by reference, describes Bayesian Network in detail. D. C. Agnew, etc., "Least Square Estimation", University of California San Diego, 2004, wholly incorporated by reference, hereinafter "Agnew", describes Least Square estimation in detail. Andrew Arnold, et al., "Temporal Causal Modeling with Graphical Granger Methods", KDD'07, August 2007, wholly incorporated by reference, hereinafter "Arnold", describes graphical Granger modeling method in detail. The computer system measures a (local) optimality in the multi-dimensional hierarchical data structure by an objective criterion (e.g., at a particular frontier at which no additional reduction in an average squared difference between actual and fitted values of metrics can be achieved by including metrics from levels below of the frontier, optionally relative to an additional complexity incurred by including these levels). A frontier refers to a cut of the multi-dimensional hierarchical data structure that is considered to be optimal or nearly optimal in terms of, e.g., predictive capabilities. The frontier is described in detail below.

The computer system performs the construction of the causal graph and graphical model partially or fully through one or more inputs of: (1) Specification of model/graph constraints (see FIGS. 9a-9f) along one or more dimensions to ensure that metric relationships between metrics at distinct nodes along those dimensions are modeled separately for an efficient frontier. (An efficient frontier refers to a cut of the multi-dimensional hierarchical data structure that is considered to be currently optimal in terms of, e.g., predictive capabilities); (2) Specification of model/graph constraints along one or more dimensions to ensure that an identical network structure is used when modeling metric data corresponding to different nodes in those dimensions, while each model is estimated as a separate model containing possibly different estimated model parameters (e.g., different model scores, etc.); (3) Specification of disallowed/forced relationships between metrics along one or more dimensions, e.g., "Total Revenue" metric cannot impact "Receivables" metric; "Total Revenue" in USA cannot impact "Total Revenue" in Canada, etc; and (4) Incorporation of user-defined functional relationships among metrics. A user may provide these inputs via a Graphical User Interface (GUI), a web site (through HTML or XML document), or by other equivalent means to the computing system.

These disallowed/forced relationships can be specified through a UI (User Interface) or inferred from attributes of a metric, e.g., any metric having an attribute "Risk Factor" may not be allowed to link to any metric having an attribute "Financial Performance."

Once a graphical model is obtained using the data modeling method, the computing system may perform several types of analysis based on the obtained model: (1) Forecasting—Predict future values of metrics included in the obtained model; (2) What-if scenario analysis—Assess future scenarios of metric value combinations; (3) Root cause analysis—Determine the most likely combination of metric values which may have resulted in a current, typically alarming, status for a target metric (e.g., target sales); and (4) Goal seek analysis—For a set of metrics, determine a set of metric values required to achieve a target metric value for one or more of the metrics. What-if scenario analysis is described in detail below in conjunction with FIG. 2. Root cause analysis is described in detail below in conjunction with FIG. 3. Goal seek analysis is described in detail below in conjunction with FIG. 4.

Figure 1:
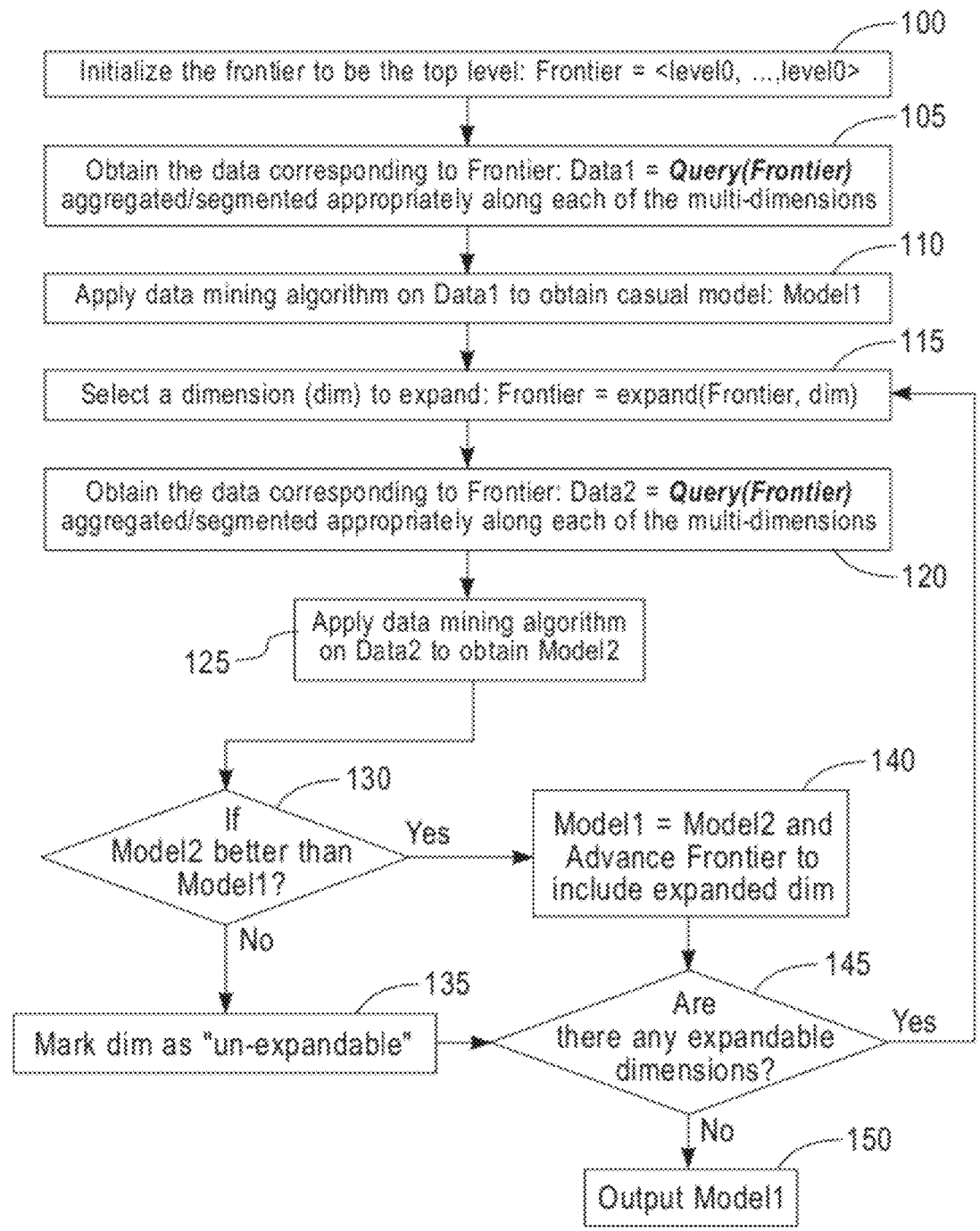
FIG. 1 illustrates a flow chart illustrating method steps for modeling of a multi-dimensional hierarchical metric cube for managing an overall performance of an entity according to one embodiment.

FIG. 1 illustrates a flow chart depicting a methodology for constructing a model (e.g., a graphical model 1175 in FIG. 11c) for managing an overall performance of an entity according to one embodiment. To run the method steps in FIG. 1, the computing system receives as an input an existing metric cube (e.g., a metric cube 600 in FIG. 6) with sufficient data entries representing the metrics, e.g., organized according to time intervals. A metric cube refers to a multi-dimensional data store (e.g., a spread sheet having multiple tabs, etc.) suitable for an analysis of performance of an entity. A user may create a metric cube, e.g., by running a business intelligence application (e.g., IBM® Cognos® Business Intelligence, Oracle® Business Intelligence Applications, etc.). A user may input and/or specify constraints (see FIGS. 9a-9f) to indicate known and/or prohibited relationships between the metrics as well as dimensional constraints. Upon receiving the existing metric cube and the constraints, the computing system validates the metric cube and constraints to ensure that there is sufficient data (e.g., an amount of data is larger than a pre-defined threshold) available for running a machine learning or data modeling algorithm. The computing system retrieves information on the dimensions, metrics and constraints from the inputs and/or the multi-dimensional hierarchical cube. The computing system finds the frontier in the cube, e.g., by comparing a current model (e.g., a graphical model 1150 in FIG. 11b) and a previous model (e.g., a graphical model 1105 in FIG. 11a). The computing system may obtain the previous model, e.g., from a database (not shown). Alternatively, a user may provide the previous model through a web site and/or GUI. Then, the computer system may perform an analysis (e.g., What-if scenario analysis illustrated in FIG. 2) and store the result of the analysis in another cube, e.g., an "impact" cube (e.g., a cube 700 in FIG. 7). An impact cube may include data in the metric cube as well as results of the analysis. An impact cube may provide information of the entity in multi-dimensions, e.g., a first dimension about a source of the information, a second dimension about a subject of the information, a third dimension about a type of the information.

Specifically, at step 100 in FIG. 1, the computing system obtains first data (not shown) corresponding to a multi-dimensional hierarchical data structure (e.g., a graphical model 1105 in FIG. 11a). The computing system initializes a first frontier to be the top level ("root") of the multi-dimensional hierarchical data structure. A frontier refers to a cut of the multi-dimensional hierarchical data structure at which a modeling algorithm (e.g., a regression modeling algorithm which is described below) builds a current model (e.g., a graphical model 1150 in FIG. 11b) of the multi-dimensional hierarchical data structure. For example, the computing system measures, e.g., for a particular time period, revenue and sales force size of a business organization (e.g., a bank, etc.) for each country (e.g., Israel 1130 in FIG. 11b) and then aggregates revenue and sales force size of each country to obtain values at each geography (e.g., EMEA (Europe, the Middle East and Africa) 1115 in FIG. 11b), where a geography includes multiple countries and each country includes multiple local regions. A multi-dimensional hierarchical data structure in this example includes, but is not limited to: geography, product category, lines of business, and geography dimension may comprise multiple hierarchical levels, such as continent, country, and region. The modeling algorithm assesses whether a more accurate model can be built based on a characterization of a relationship between, e.g., revenue and sales force size, measured at which cuts of a dimension, e.g. the geography, country, or regional levels. If, for this example, a better model can be estimated for measures of revenue and sales force size per country, then country is considered to be the "frontier" cut of the model.

In one embodiment, to determine whether a current model (e.g., a graphical model 1150 in FIG. 11b) is better than a previous model (e.g., a graphical model 1100 in FIG. 11a), the computing system calculates a reduction in predictive mean square error of each model, optionally in a separate "hold out" data set. A predictive mean square error assesses an adequacy of a prediction. (See Richard T. Baillie, "The Asymptotic Mean Squared Error of Multistep Prediction from the Regression Model with Autoregressive Errors", pp. 175-184, Journal of the American Statistical Association, March 1979, Vol. 74, Number 365, Theory and Methods Section, wholly incorporated by reference, hereinafter "Baillie," describing how to calculate predictive mean square error in detail.)

In one embodiment, the computing system identifies a relationship between metrics based on assessment of a dependency between the metrics. An example method of the assessment is a calculation of a linear correlation coefficient between a first metric at time t and a second metric at time t-1. Another example assessment method is a reduction in predictive mean squared error when the second metric at time t-1 is included in a model as a predictor of the first metric at time t relative to the model in which the second metric is not included. (See Herve Abdi, et al., "Experimental Design & Analysis for Psychology", Chapter 2, Feb. 26, 2009, Oxford University Press, http://www.oup.com/uk/orcibin/9780199299881/ch02.pdf, wholly incorporated by reference, hereinafter "Abdi," describing a calculation of a correlation coefficient in detail.)

Returning to FIG. 1, at step 100, the computing system also receives constraints (not shown in FIG. 1) on the multi-dimensional hierarchical structure. In one embodiment, a user specifies constraints on metrics in the multi-dimensional hierarchical structure, e.g., through IBM® Cognos® TM1 software, XML, a User Interface, etc. One constraint specified includes a metric constraint including, without limitation, (1) Force or Prohibit a metric to be a source or target metric (e.g., a source or target node in a graphical model); (2) Force or Prohibit a source metric impacting a target metric; (3) Force or Prohibit a metric having an attribute to be a source or target; and (4) Force or Prohibit a source metric having an attribute that impacts a target metric having an attribute. Another specified constraint includes a dimension constraint including, without limitation, (1) disallowing a metric to impact metrics at different nodes (e.g., Israel 1130 and France 1135 in FIG. 11b) in a specified dimension; and (2) imposing a similar impact between any pair of metrics in modeling separate models corresponding to distinct nodes in the frontier in a chosen dimension or other dimensions.

Figure 9B:
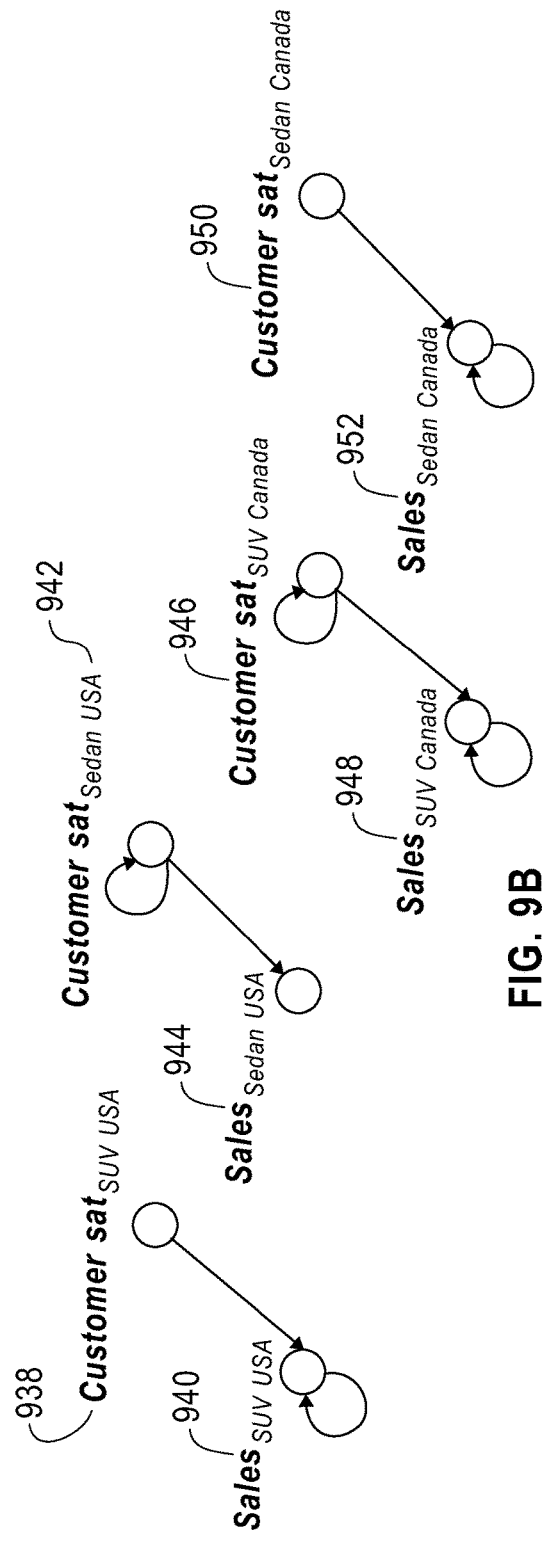

FIGS. 9a-9f illustrate exemplary constraints imposed on a multi-dimensional hierarchical data structure in one embodiment. FIG. 9a illustrates imposing a constraint that only allows local models ("segmentation"). In FIG. 9a, relations are only allowed between metrics at a same node in the multi-dimensional hierarchical data structure, in a specified dimension. For example, FIG. 9a illustrates a multi-dimensional hierarchical data structure 960 including two dimensions, a dimension 900 and another dimension 936. The dimension 900 includes, but is not limited to, a geography 902 at the top level, North America 904, EMEA (Europe, the Middle East and Africa) 906, and AP (Asia Pacific) 908 at a second level. North America 904 expands to include Canada 910 and USA 912. EMEA 906 expands to include Israel 914 and France 916. AP 908 expands to include Japan 918 and Korea 920. The dimension 936 includes, but is not limited to, a product 922 at the top level. The product 922 expands to include a car 924 and a truck 934 at the second level. The car 922 expands to include a SUV (Sport Utility Vehicle) 926 and a sedan 928 at the third level. According to this constraint that allows only local models, as shown in FIG. 9b, a metric for a specific node affects only another metric for the same node, in a relevant dimension. For example, customer satisfaction of SUV in USA 938 affects SUV sales in USA 940. SUV sales in USA 940 may affect also itself. Customer satisfaction of sedan in USA 942 affects sedan sales in USA 944. The customer satisfaction of sedan in USA 942 may affect itself. The customer satisfaction of SUV in Canada 946 affects SUV sales in Canada 948. SUV sales in Canada 948 may affect also itself. Customer satisfaction of sedan in Canada 950 affects sedan sales in Canada 952. The sedan sales in Canada 952 may affect itself.

Figure 9C:
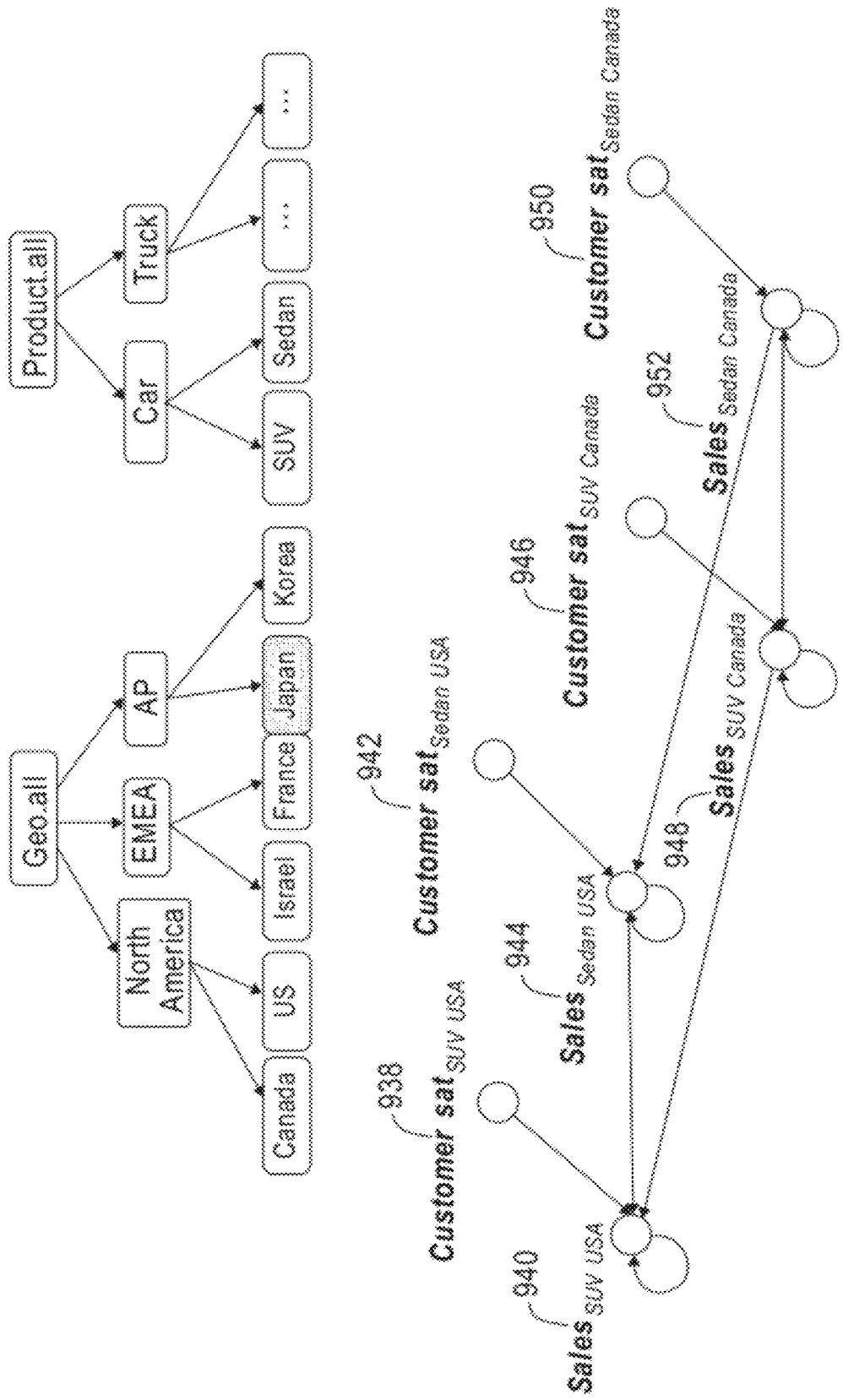

FIG. 9c illustrates an exemplary constraint that allows all possible relationships between metrics ("No segmentation"). In this exemplary constraint illustrated in FIG. 9c, a metric for a node is allowed to affect any metric for any other node. For example, customer satisfaction of SUV in USA 938 affects SUV sales in USA 940. SUV sales in USA 940 may affect also itself. Customer satisfaction of sedan in USA 942 affects sedan sales in USA 944. Sedan sales in USA 944 may affect itself. The customer satisfaction of SUV in Canada 946 affects SUV sales in Canada 948. SUV sales in Canada 948 may affect also itself. Customer satisfaction of sedan in Canada 950 affects sedan sales in Canada 952. The sedan sales in Canada 952 may affect itself. SUV sales in USA 940 affect sedan sales in USA 944, and vice versa. Sedan sales in Canada 952 affect sedan sales in USA 944. Sedan sales in Canada 952 affect SUV sales in Canada 948, vice versa. SUV sales in Canada 948 affect SUV sales in USA 940.

Figure 9D:
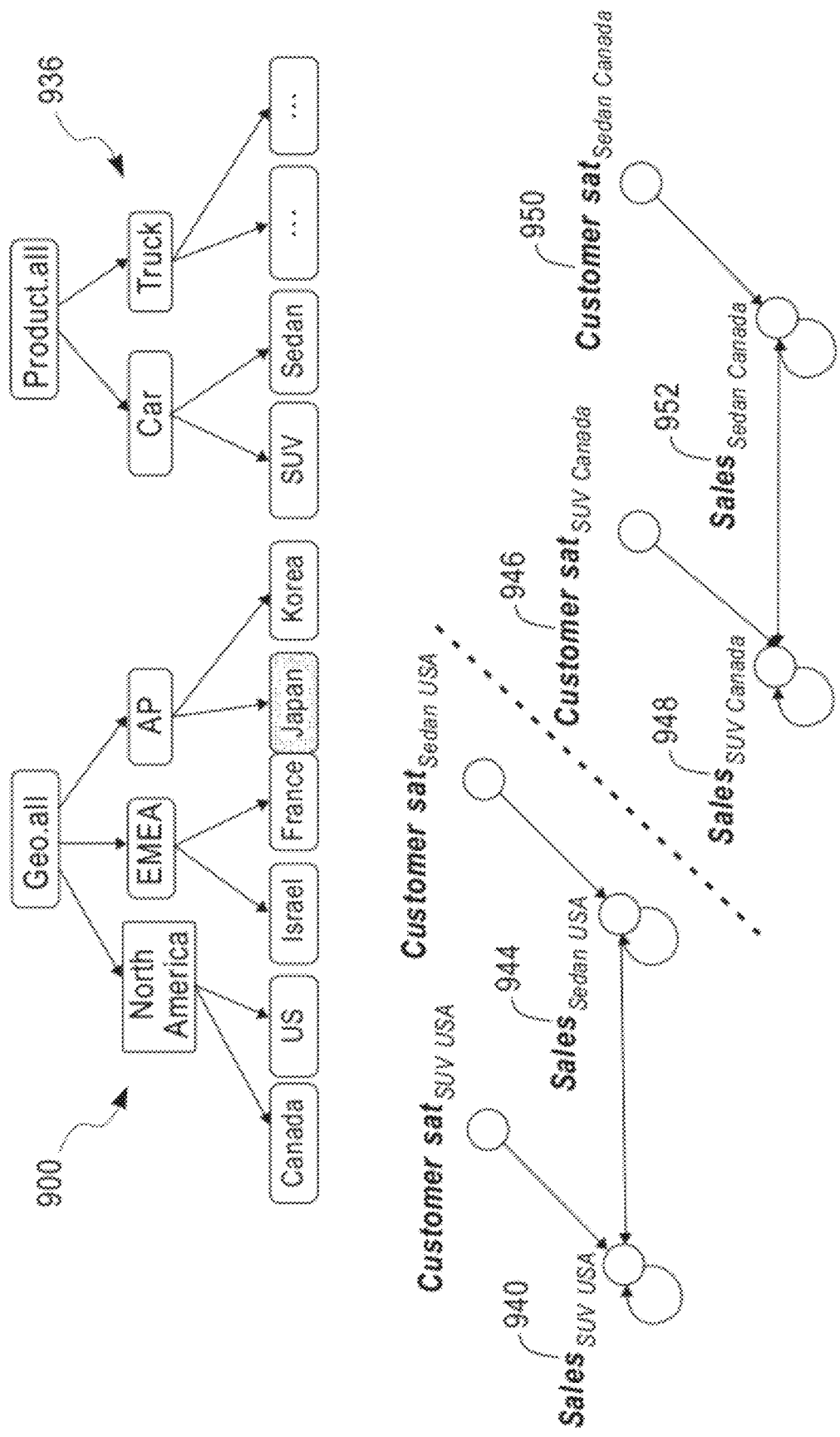

FIG. 9d illustrates an exemplary constraint that allows relationships between metrics depending on dimensions. For certain dimensions, the computer system allows relationships across nodes, while the computer system does not allow relationships across nodes in other dimensions. For example, as illustrated in FIG. 9d, metrics may impact across the "product" dimension 936 but not across the "geography" dimension 900. Specifically, sedan sales (e.g., sedan sales in USA 944) can impact sales of SUV (e.g., SUV sales in USA 940). Sales in Canada cannot impact sales in USA. Customer satisfaction of Sedan in Canada 950 can impact SUV sales in Canada 948. However, customer satisfaction of SUV in Canada 946 cannot impact SUV sales in USA 940.

Figure 9E:
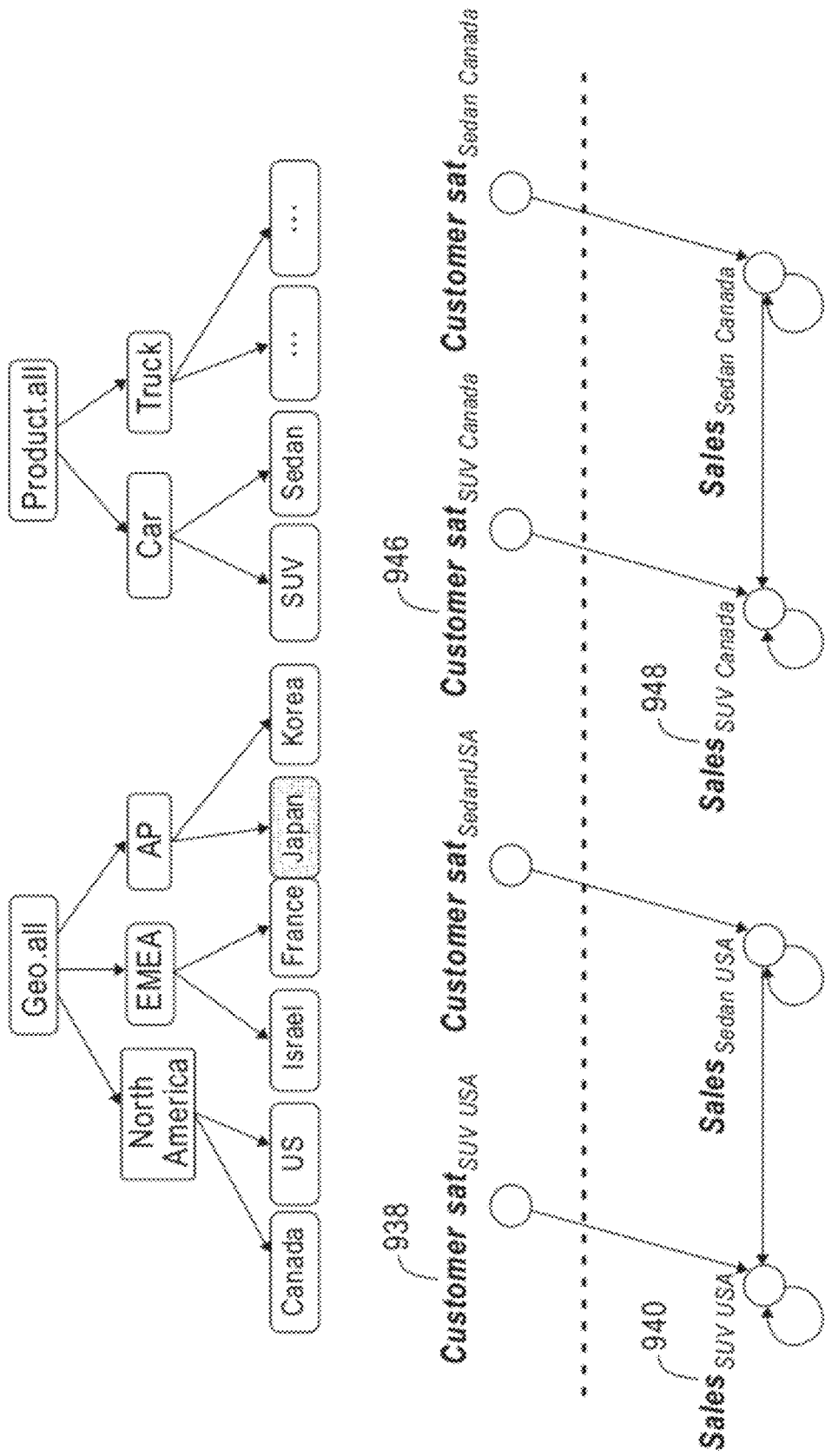

FIG. 9e illustrates an exemplary constraint that allows relationships depending on metrics. For example, the computer system may allow edges from certain metrics (e.g., certain nodes in a causal graph) but may not allow edges from other metrics. As illustrated in FIG. 9e, customer satisfaction of SUV in USA 938 can impact SUV sales in USA 940 but not vice versa. Customer satisfaction of SUV in Canada 946 can impact SUV sales in Canada 948 but not vice versa. In other words, customer satisfaction can impact sales but not vice versa. In another example (not shown), customer satisfaction may not be affected by any other metric. Sales may not be affected by any other metric.

Figure 9F:
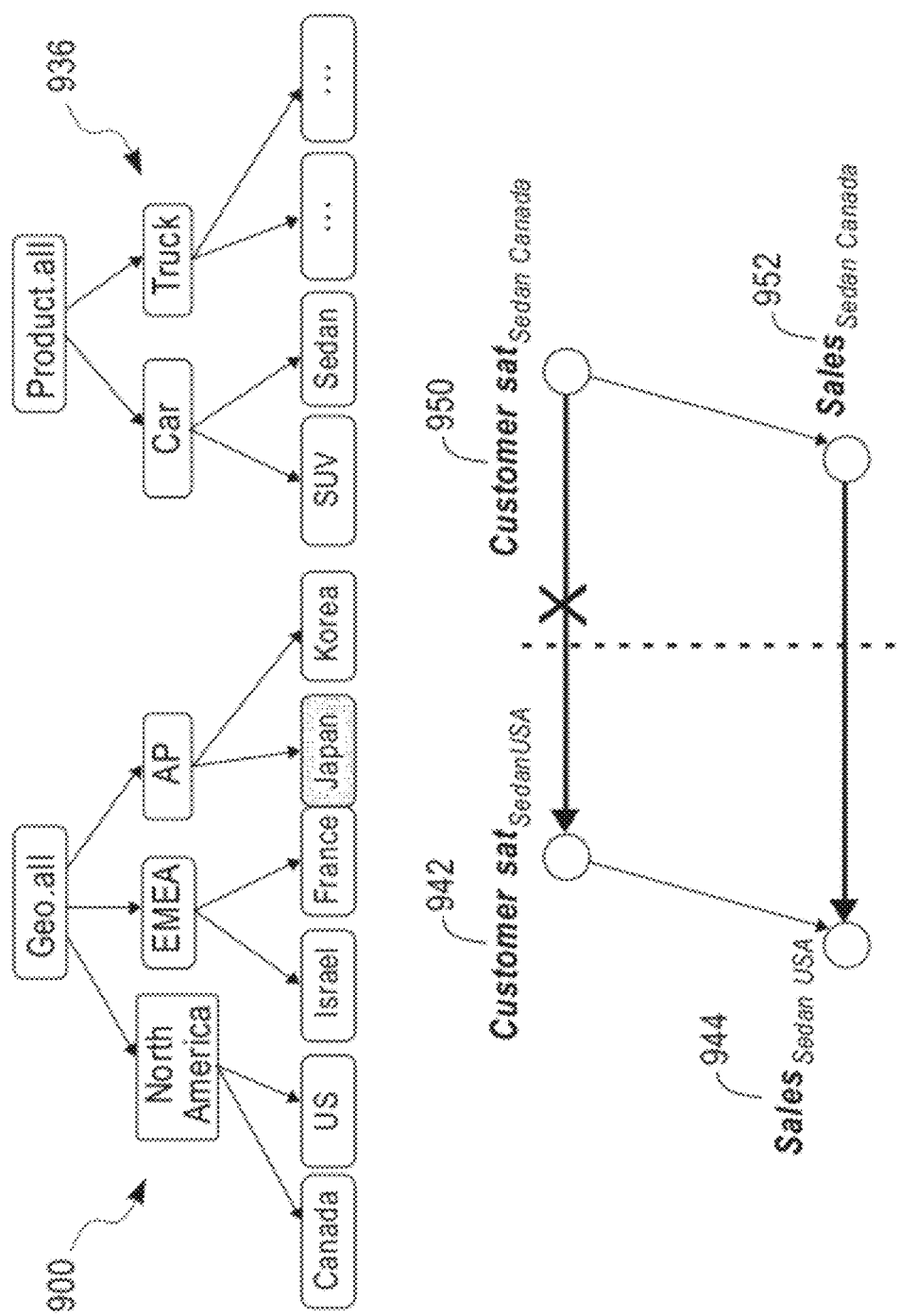

FIG. 9f illustrates an exemplary constraint that allows relationships depending on dimensions and metrics. For particular metrics and dimensions, the computer system allows relationships for some combinations of metrics and dimensions, while the computer system may not allow relationships for other combinations of metrics and dimensions. For example, sales of cars in Canada (e.g., sedan sales in Canada 952) can impact sales of cars in USA (e.g., sedan sales in USA 944). However, customer satisfaction of cars in Canada (e.g., customer satisfaction of sedan in Canada 950) may not impact customer satisfaction of cars in USA (e.g., customer satisfaction of sedan in USA 942). Customer satisfaction of cars in Canada may not impact sales of cars in USA.

Figure 2:
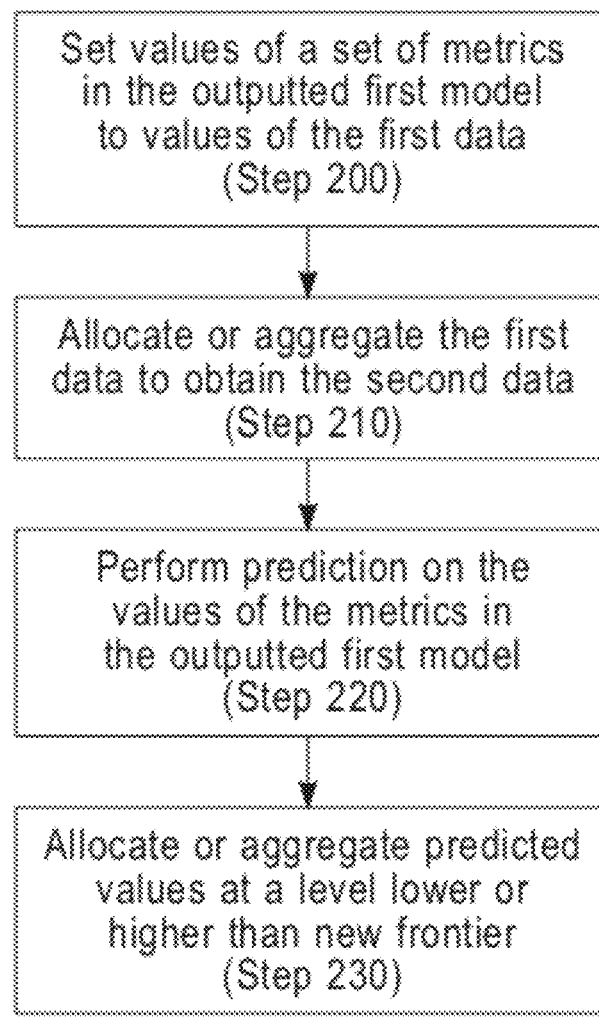
FIG. 2 illustrates a flow chart illustrating method steps for a first analysis in one embodiment.

Returning to FIG. 1, at step 105, the computing system acquires first data corresponding to the first frontier of the multi-dimensional hierarchical data structure initialized at step 100. In one embodiment, the computing system makes prediction on various metrics concerning the performance of the entity based on the frontier, e.g., by running the method steps in FIGS. 2-4. FIGS. 2-4 are described in detail below. In one embodiment, the computing system acquires the first data, e.g., by sending at least one query to a database storing the frontier. Then, the computing system obtains, without limitation, metrics for the frontier, e.g., from the database.

At step 110, the computing system performs data modeling on the second data to obtain a first model (e.g., a graphical model 1170 in FIG. 11b including at least one node and typically at least one edge) and a corresponding representative model score statistic ("first value"). Data modeling technique includes, but is not limited to: probabilistic graphical modeling (e.g., Bayesian Network learning method), least square estimation method, and graphical Granger modeling methods, regression modeling method, and generalized linear modeling method, etc. In one embodiment, to obtain a first model, the computing system runs a modeling algorithm, e.g., a regression modeling algorithm, based on the first data. The first value includes, but is not limited to, the predictive square error means of the first model.

Following describes an exemplary regression modeling algorithm.

Input: Time series data $\{X_t\}_{t=1, \ldots, M}$, where each $X_t$ is a p-dimensional vector.

Input: A regression method ("REG"); REG is described below in detail.
Process: 1. Initialize an adjacency matrix for p features, i.e., G=(V, E), where V is a set of p features (e.g., by all 0's) and E is a set of edges between the features.
2. For each feature y∈V, run REG on every y in terms of past lagged variables, $X_{t-d}, \ldots, X_{t-1}$, for all the features x∈V, i.e., build a regression tree with an input of $(y_M, y_{M-1}, \ldots, y_{M+d})^T$ in terms of $$\begin{pmatrix} x^1_{T-1} & \cdots & x^1_{T-d} & \cdots & x^p_{T-1} & \cdots & x^p_{T-d} \\ x^1_{T-2} & \cdots & x^1_{T-1-d} & \cdots & x^p_{T-2} & \cdots & x^p_{T-1-d} \\ \vdots & \vdots & \vdots & \vdots & \vdots & \vdots & \vdots \\ x^1_d & \cdots & x^1_1 & \cdots & x^p_d & \cdots & x^p_1 \end{pmatrix},$$

where $V = \{x^j, j = 1, \ldots, p\}$

3. For each feature x∈V, place an edge x→y into E, if and only if x was selected as a group by REG.

Following describes an exemplary regression method ("REG").
Input: A data matrix $X=[f_1, \ldots, f_d] \in R^{n \times d}$ with a group structure $G_1, \ldots, G_J$ and such that $X_{Gj}^* X_{Gj} = I_{dj}$. A response $y \in R^n$ and precision $\varepsilon > 0$ for a stopping criterion. R is a set of real numbers. d and n are integer numbers.
Output: Selected groups $g^{(k)}$ and a regression coefficient $\beta^{(k)}$.
Process: Initialize $g^{(0)}=0$, $\beta^{(0)}=0$.

For k = 1, 2, ...
    Let $j^{(k)} = \text{argmax}_j \|X_{Gj}^* (X\beta^{((k-1)-y)})\|_2$
    If $\|X_{Gj}^{(k)} * X_{Gj} * (X\beta^{(k-1)-y})\|_2 \leq \varepsilon$ break
    Set $g^{(k)} = g^{(k-1)} \cup G_{j^{(k)}}$.
    Let $\beta^{(k)} = \hat{\beta}_X(g^{(k-1)}, y)$.
End $\beta^{(k)}$ is an ordinary least square estimation based on the groups selected up to round k. The "for" loop is computed to conduct j iterations, where j is the number of groups. The optimal stopping criterion can be chosen, e.g., by a cross validation or using a model selection criterion (e.g., BIC (Bayesian Information Criterion)). Cross validation is referred to herein as validating across one or more separate "hold out" data sets. According to BIC, for example, a stopping criterion $$\hat{k} = \text{argmin}_k \frac{\|y - \beta^{(k)} X\|^2}{n\sigma^2} + \frac{\log(n)}{n} \sum_{G_j \in G^{(k)}} d_j$$

Least square estimation provides a way to balance fitting data closely to models while avoiding excessive roughness and rapid variation. "Agnew" reference describes Least square estimation in detail.

Returning to FIG. 1, at step 110, to obtain the first model, the computing system may aggregate data corresponding to nodes in a dimension of the hierarchical data structure. In other words, data the computing system obtains for a node combination in a cut of the multi-dimensional hierarchical data structure include values that are aggregated, in each dimension, over all nodes below that node combination in the hierarchical data structure. The computer system may also construct a separate model corresponding to distinct nodes in a set of dimensions of the hierarchical data structure. In other words, the computing system builds a separate model per node combination in a set of dimensions of the hierarchical data structure, whose model variables are mutually unrelated.

Returning to FIG. 1, at step 115, the computing system expands a dimension of the first frontier. For example, as illustrated in FIGS. 11a-11c, the computing system obtains the first model 1105 which includes two dimensions (a "geography" dimension 1100 and a "product" dimension 1120 after running the method steps 100-110 in FIG. 1. The computing system may set the frontier at "EMEA" node 1115 at step 110 in FIG. 1. Then, at step 115, the computing system expands the "geography" dimension 1100 from the frontier "EMEA" node 1115. After expanding, the computing system may obtain an expanded "geography" dimension 1150 as shown in FIG. 11b. The expanded "geography" dimension includes at least two additional leaf nodes (e.g., "Israel" node 1130 and "France" node 1135) underneath the frontier "EMEA" node 1115.

Returning to FIG. 1, at step 120, the computing system gathers second data corresponding to the expanded frontier (e.g., an expanded frontier 1170 in FIG. 11b) that includes the expanded dimension (e.g., the expanded "geography" dimension 1150 in FIG. 11b), e.g., by sending a query to a database storing the expanded first model. At step 125, the computing system applies at least one data modeling technique on the second data to obtain a second model (e.g., a second model 1175 in FIG. 11c) and a corresponding representative model score statistic ("second value"). The second value includes, but is not limited to, predictive square error means of the second model. Alternatively, the computing system can obtain the second model, e.g., by uniformly expanding all nodes of the frontier. In one embodiment, the first value and second values represent statistical values (e.g., predictive square error means, etc.) of first and second models respectively.

Returning to FIG. 1, at step 130, the computing system compares the first model (e.g., the first model 1105 in FIG. 11a) and the second model (e.g., the second model 1175 in FIG. 11c). For example, the computing system compares the first and the second model via a statistical significance test (e.g., known F-test). The computing system calculates, as the first and second statistics that represent statistical values, respective overall statistical significance of the first model and the second model, and comparing the calculated statistical significances. The computing system performs the statistical significance test across all the models. This statistical significance test consists in computing the probability P that the second model would give rise to a better fit than the first model, assuming that the first model is the true model. A larger value of "P" (e.g., "P"=0.8) corresponds to a smaller value of the statistical significance (e.g., statistical significance=1−0.8=0.2) for the second model compared to the first one. In another example, the computing system calculates predictive square error means of the first model and second model optionally using the cross validation. The computing system compares the calculated predictive squared error means and determines that a model having a lesser value of predictive squared error means is better than the other model. The mean square error represents the average over some data points of the squared difference between predicted and actual values for those data points. (See "Baillie" reference describing how to calculate predictive mean square error means.) In another example, the computing system performs a likelihood ratio test to compare the first and second models.

Returning to FIG. 1, at step 135, upon deciding that the first model is better than the second model, the computing system marks the dimension node (i.e., the expanded frontier) that has just been expanded to obtain the second model as un-expandable. At step 140, upon deciding that the second model is better than the first model, the computing system sets the second model to be the first model (i.e., Model1=Model2) and sets the expanded frontier as a new frontier. At step 145, the computing system evaluates whether there is any further expandable dimensions (e.g., a dimension 1120 in FIG. 11a) in the multi-dimensional hierarchical data structure (e.g., a multi-dimensional hierarchical data structure 1105 in FIG. 11a). In one embodiment, the computing system determines whether a dimension is expandable or not, e.g., by maintaining information of expandability of the multi-dimensional hierarchical data structure, updating the multi-dimensional hierarchical data structure whenever a new node is marked "un-expandable", and searching through this data structure for a frontier to find out whether the frontier is expandable. If the computing system determines that there is at least one expandable dimension in the first frontier, the computing system repeats the steps 115-145 in FIG. 1 to expand the expandable dimension in the first frontier. Otherwise, at step 150, the computing system outputs the first model.

Figure 10:
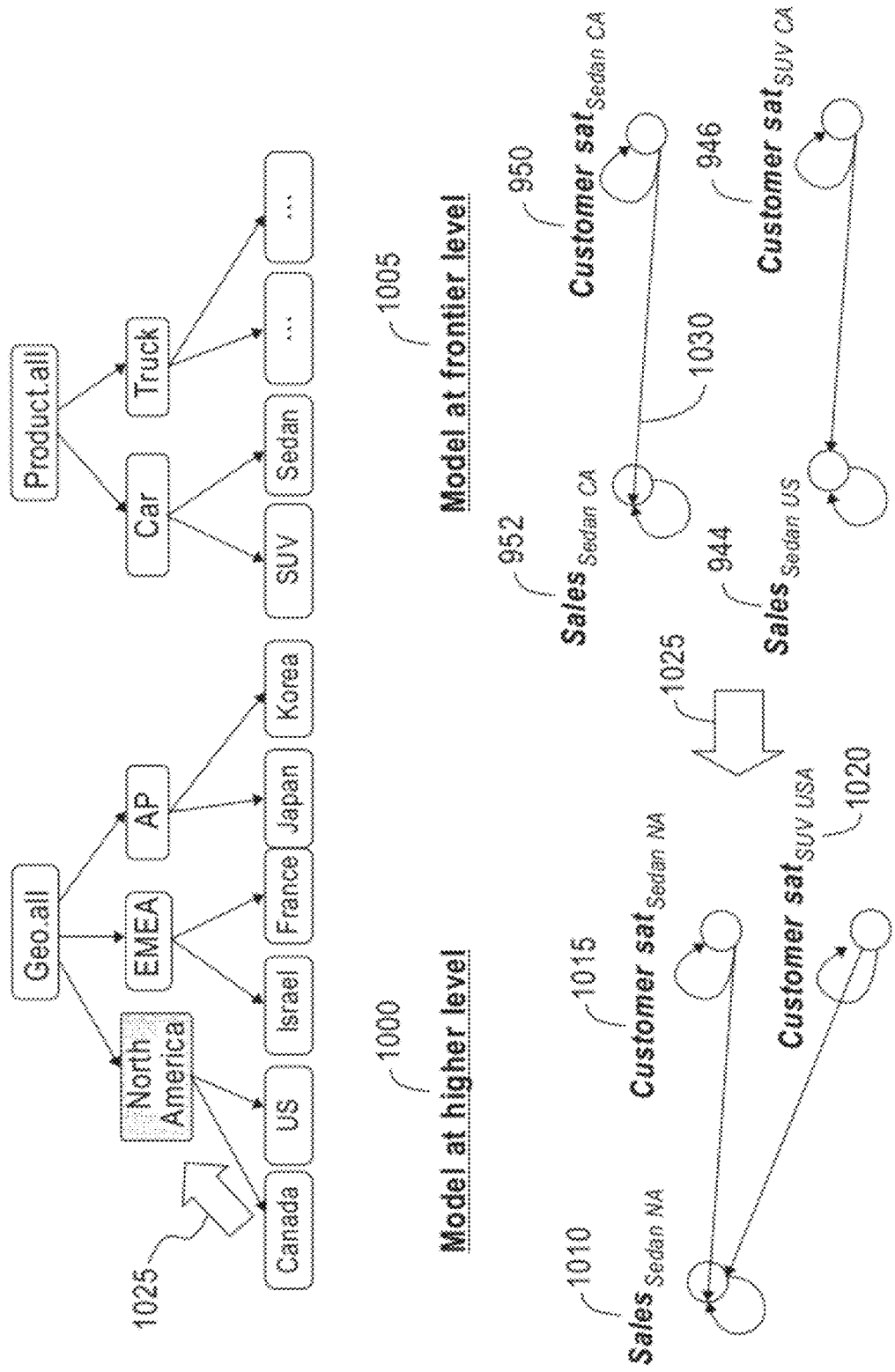
FIG. 10 illustrates exemplary models to compute aggregated relationships in one embodiment.

In one embodiment, the computing system analyzes the output model, in one or more of: a first analysis ("What-if scenario analysis"), a second analysis ("Root cause analysis") and a third analysis ("Goal seek analysis"). FIG. 2 illustrates a flow chart depicting of method steps for performing the first analysis in a further embodiment. The first analysis predicts future values of metrics included in the outputted first model. At step 200, the computing system optionally sets values of a set of (scenario) metrics in the outputted first model to values in the first data (i.e., the first data obtained at step 100 in FIG. 1). At step 210, the computing system optionally allocates or aggregates the first data to acquire the second data (i.e., the second data at step 105 in FIG. 1). At step 220, the computing system performs a prediction on values of metrics based on the outputted first model and the optionally set values, e.g., by using statistical inference. George Casella, et al., "Solutions Manual for Statistical Inference, Second Edition", wholly incorporated by reference as if set forth herein, hereinafter "Casella reference", describes a statistical inference method in detail. At step 230, the computing system allocates or aggregates (e.g., aggregation 1025 in FIG. 10) predictive values at a level lower or higher than the frontier level. For example, as illustrated in FIG. 10, the computing system predicts sedan sales in North America, e.g., by aggregating 1025 an effect on sedan sales in Canada 952 from customer satisfaction of sedan in Canada 950 and another effect on sedan sales in USA 944 from customer satisfaction of SUV in Canada 946. In this example, the computing system calculates a predicted value of sedan sales in North America 1010, e.g., as the sum of the predicted values of sedan sales in USA 944 and sedan sales in Canada 946. Depending on the nature of the metrics involved, the computing system may use aggregation functions (e.g., weighted sum and average) other than the sum.

FIG. 3 illustrates a flow chart depicting method steps employed for performing the second analysis in a further embodiment. The second analysis determines a root cause of a deviation or anomaly in the values of the metrics. At step 300, the computing system performs the first analysis (i.e., method steps 200-220 in FIG. 2) in which selected metrics in the multi-dimensional hierarchical data structure are changed towards their mean values as scenario metrics. At step 310, the computing system examines the effect on a value of a metric of interest ("target metric"). For example, Step 310 may comprise examining how close the value of the metric of interest is brought to its mean value as a result of the value change in a scenario metric. At step 320, the computing system determines which metric at a particular time is to be characterized as a main cause of a deviation from the predictive values, e.g., by choosing a metric which brings back the value of the target metric closest to the predictive value or the mean value with a unit change. To make the determination at step 320, the computing system may evaluate one or more of: a distance between the main cause metric and the target metric in the output first model, how far in the past is the time step in question (e.g., the number of time steps between the time of identified deviation in a candidate root cause metric and the time of deviation of the metric of interest), an extent to which other metrics which may be affected adversely by the main cause metric, an inclusion of an additional term or condition in this evaluation to find out the main cause metric.

FIG. 4 illustrates a flow chart depicting of method steps for performing the third analysis in a further embodiment. The third analysis determines a set of candidate metrics for which a change in a value of the candidate metrics causes a predicted value of a target metric to assume a desired value. At step 400, the computing system performs the first analysis or prediction in which metrics in the multi-dimensional hierarchical data structure are changed in a direction suggested by the outputted first model. At step 410, the computing system examines an effect on a value of the target metric. At step 420, the computing system determines which metric in the multi-dimensional hierarchical data structure is projected to achieve a desirable value, e.g., by choosing a metric that brings its value closest to the predictive value with a unit change. To make the determination at step 420, the computing system may evaluate one or more of: a distance between the main cause metric and the target metric in the output first model, how far in the past is the time step in question, an extent to which other metrics which may be affected adversely by the main cause metric, an inclusion of an additional term or condition in this evaluation to judge the main cause.

In a further embodiment, the computing system determines causal relations and their associated measures of strength at cuts in the frontier in the outputted first model, e.g., by calculating a causal strength, per each candidate relation, or a pair of metrics, in the cuts in the frontier, as the weighted sum of the causal strengths of all causal relations included in the outputted first model, whose dimension nodes are equal or descendents of those of a candidate relation under consideration, in which the weight of each causal strength is determined as a ratio between the value of the target metric at the frontier and the aggregated value of the target metric at the cuts. For example, as illustrated in an exemplary frontier model 1005 in FIG. 10, if the computing system identifies a (causal) relationship from customer satisfaction of sedan in Canada 950 to sedan sales in Canada 952 with a causal strength of 0.4, and another (causal) relationship from customer satisfaction of SUV in Canada 946 to sedan sales in USA 944 with a causal strength of 0.3, e.g., by assessing a correlation coefficient of each metric or predictive mean square error of each metric, the computing system can aggregate 1025 these relationships as illustrated in an exemplary higher level model 1000 in FIG. 10. In the exemplary higher level model 1000, customer satisfaction of sedan in North America 1015 and customer satisfaction of SUV in North America 1020 affect sedan sales in North America 1010. The computing system may aggregate 1025 the causal strength of the identified relationships as follows: the causal strength for the relationship between customer satisfaction of sedan in North America 1015 as the cause and the sedan sales in North America 1010 as the target is set to 0.4×(sedan sales in Canada 952/sedan sales in North America 1010), where (sedan sales in Canada 952/sedan sales in North America 1010) denotes the historical proportion of Canadian sedan sales within the North American sedan sales; the causal strength for the relationship between customer satisfaction of SUV in North America 1020 as the cause and the sedan sales in North America as the target is set to 0.3×(sedan sales in USA 944/sedan sales in Canada 952), where (sedan sales in USA 944/sedan sales in Canada 952) denotes the historical proportion of USA sedan sales within the North American sedan sales.

In a further embodiment, the computer system predicts future values of metrics included in the output model, e.g., by using a statistical inference technique described in "Casella reference".

In one embodiment, the computing system determines a measure of strengths of causal relations in the outputted first model, e.g., by calculating for each of the causal relations a score that is a function of model coefficients associated with the said causal relation, the score including one or more of: L1 norm, L2 norm, sum, and maximum. A norm refers to a quantity that describes characteristic of a mathematical object. $L^P$ spaces are functional spaces defined using P-norms for finite-dimensional vector spaces. $L^2$ norm may be equivalent to Euclidean norm. Qifa Ke, et al., "Robust Subspace Computation Using L1 Norm," CMU-CS-03-172, August, 2003, wholly incorporated by reference as if set forth herein, describes L1 norm computation and L2 norm computation in detail.

Figure 5:
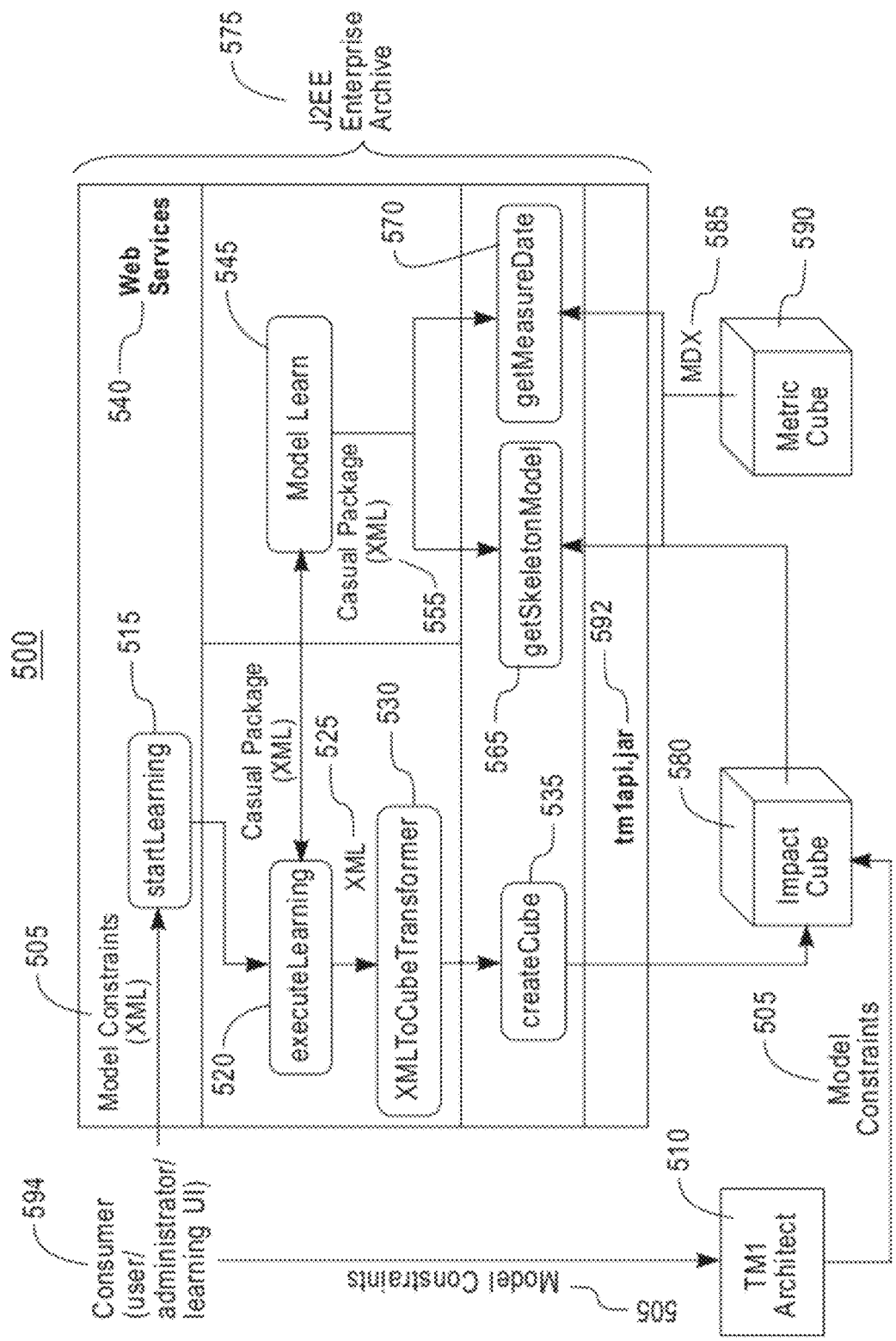
FIG. 5 illustrates a system diagram for performing the method steps depicted in FIG. 1 according to one embodiment.

FIG. 5 illustrates a system diagram to run method steps depicted in FIG. 1 in one exemplary embodiment. A system 500 includes, but is not limited to, a first component 575 and a second component 510. The system 500 may be implemented in the computing system 800 illustrated in FIG. 8. The first component 575 may be implemented in Java® Runtime Environment. The second component 510 may be implemented in an enterprise planning software (e.g., IBM® Cognos® TM1, etc.). The first component 575 runs the method steps in FIG. 1 and performs analysis on the output model, e.g., by running method steps in FIGS. 2-4. The second component 575 is a Business Intelligence application (e.g., Microsoft® Business Intelligence solutions, etc.) to collect, store, analyze and/or provide access to data to assist business users to make efficient business decisions.

For example, in one embodiment, the first component 575 includes, but is not limited to, a start engine 515, a learning engine 520, a transforming engine 530, a cube creation engine 535, a model learning engine 545, a skeleton model engine 565, and a measurement engine 570. A user 594 provides model constraints 505 (see FIGS. 9a-9f) to the start engine 515, e.g., through a user interface. The user 594 may write the model constraints 505 in a markup language, e.g., XML, HTML, etc. In one embodiment, the user may provide the model constraints 505 through a web site/service 540. Upon receiving the model constraints 505, the start engine 515 retrieves a corresponding multi-dimensional hierarchical data structure, e.g., from a database (not shown). The start engine 515 forwards the model constraints 505 and the multi-dimensional hierarchical data structure to the learning engine 520.

The learning engine 520 traverses the multi-dimensional hierarchical data structure in a search of a frontier and a corresponding model (e.g., the output first model at step 150 in FIG. 1). Specifically, the learning engine 520 obtains data, e.g., from the second component 510, corresponding to all measurements (i.e., all metrics in a dimension) of a current frontier (e.g., "EMEA" node 1115 in FIG. 11a). The learning engine 520 may optionally aggregate 1025 relationships found at the frontier as illustrated in FIG. 10.

The learning engine 520 performs modeling according to method steps illustrated in FIG. 1. Before or while modeling, the learning engine 520 evaluates the model constraints 505 as illustrated in FIGS. 9a-9f. After obtaining a current model (e.g., the second model obtained at step 120 in FIG. 1), the learning engine 520 compares the current model with a previous best model (e.g., the first model obtained at step 110 in FIG. 1), e.g., by calculating and comparing correlation coefficient or model error measure of each model. If the current model is better than the previous best model, e.g., if a correlation coefficient of the current model is higher than a correlation coefficient of the previous best model, the learning model 520 advances the current frontier to include the current model. In other words, the learning model 520 advances the current frontier (e.g., "EMEA" node 1115 in FIG. 11a) to a set of new descendent nodes (e.g., "Israel" node 1130 in FIG. 11b) that were included in the data for the current model. If the previous best model is better than the current model, the learning engine 520 marks the current model as un-expandable and sets the current model to be the previous best model. The learning model 520 checks whether the current frontier of the current model can be further expanded, e.g., by performing machine learning at the current frontier. If the current frontier is further expandable, the learning model 520 expands the current frontier further as shown in FIGS. 11a-11c. Otherwise, the learning model 520 outputs the current model to the transforming engine 530 and/or to the model learning engine 545. In one embodiment, the learning model 520 outputs the current model in an XML format. The output current model ("Causal Package") includes, but is not limited to, measurements (metrics and dimensions), causal graphs (e.g., graphs illustrated in FIG. 9b) over the measurements, predictive values for metrics, etc.

The transforming engine 530 and the cube creation engine 535 transform the Causal Package into an Impact Cube (e.g., an Impact Cube 700 in FIG. 7). Specifically, upon receiving the Causal Package, the engines 530-535 use an API (Application Programming Interface) 592 to construct an empty cube (e.g., an empty spreadsheet having several tabs) if the cube does not exist, insert metrics into the cube, insert relationships (e.g., a model 1000 and/or another model 1005 in FIG. 10) between the metrics into the cube, and load the cube on an appropriate sever running the second component 510. Then, the engines 530-535 output the loaded cube ("Impact Cube") to the skeleton model engine 565, e.g., in a form of a XML or HTML document 555.

FIG. 7 illustrates an exemplary Impact Cube 700 in one embodiment. This exemplary Impact Cube 700 includes at least two different dimensions: a measure dimension 700 and an impact attribute dimension 720. The measure dimension 710 includes a plurality of metrics (i.e., a plurality of dimension attributes for the measurements): Receivable 705, Total Revenue 715, Total Expenses 725, etc. Each metric in the measure dimension 710 may include a plurality of relationships with the impact attribute dimension 720. The impact attribute dimension 720 includes a plurality of metrics: a source cube 730, source dimension 735, a source measure 740, a source node 745, a target node 750, a strength 755, a lag 760, a most important lag 765, a function 770, a coefficient 775, a user defined indication 780, etc. The source cube metric 730, source dimension metric 735 and source measure metric 740 refer to parents of the relationships. The source node 745 refers to dimensions of the parent measure. An exemplary format of the source node 745 is Dimension1[Level0.Level1 . . . ].Dimesion2 [Level0.Level1 . . . ]. The strength 755 indicates a strength of a relationship. For example, in FIG. 10, the computing system calculates a strength of a relationship between sedan sales in Canada 952 and customer satisfaction of sedan in Canada 950, e.g., by sedan sales in Canada 952=0.4× customer satisfaction of sedan in Canada 950. The computing system calculates a strength of a relationship between sedan sales in USA 944 and customer satisfaction of SUV in Canada 946, e.g., by sedan sales in USA 944=0.3×customer satisfaction of SUV in Canada 946. A lag 760 indicates a time lag between a change in the parent measure affecting the child measure. A most important lag 765 refers to the lag which is most important from a list of lags 760. A function 770 indicates a derived functional relationship (e.g., a relationship 1030 in FIG. 10; customer satisfaction of sedan in Canada 950 affects sedan sales in Canada 952). In FIG. 7a, a coefficient 775 indicates a value of a coefficient involved in a functional relationship. A user defined indication 780 indicates whether a relationship between metrics is defined by a user.

Returning to FIG. 5, in an alternative exemplary embodiment, the second component (e.g., IBM® Cognos® TM1 software) 510 generates the Impact Cube 580 based on the model constraints 505 provided from the user 594, e.g., by filling an empty spreadsheet having multiple tabs with metrics and their relationships. The second component 510 provides the Impact Cube 580 to the skeleton model engine 565 and the measurement engine 570.

In FIG. 5, the model learning engine 545 analyzes the Causal Package, e.g., by running the first analysis (i.e., method steps in FIG. 2), the second analysis (i.e., method steps in FIG. 3), and/or the third analysis (i.e., method steps in FIG. 4). Then, the model learning engine 545 provides the analyzed Causal Package to the learning engine 520, the skeleton model engine 565 and the measurement engine 570. The measurement engine 570 obtains the measurements (metrics) from the analyzed Causal Package. The measurement engine 570 and the skeleton model engine 565 may retrieve a Metric Cube 590 from a database (not shown), e.g., by sending a query 585 to the database. FIG. 6 illustrates an exemplary Metric Cube 600 in one embodiment. The exemplary Metric Cube 600 includes a plurality of dimensions: a measure dimension 610, a "Business Unit" dimension 620, a "Product" dimension 630, a "Time" dimension 640. The measure dimension 610 includes, for example, at least 35 metrics. The "Business Unit" dimension 620 includes, for example, at least two levels. The "Product" dimension 630 includes, for example, at least five levels. The "Time" dimension 640 includes at least three levels, e.g., a year, a quarter, a month.

Upon receiving the Impact Cube 580, Metric Cube 590 and/or the analyzed Causal Package, the skeleton model engine 565 retrieves metrics (or values in the metrics) and dimensions from the Metric Cube 590. The skeleton model engine 565 retrieves the model constraints 505 from the Impact Cube 580. Then, the skeleton model engine 565 outputs the analyzed Causal Package, the retrieved metrics, the retrieved model constraints, at least one multi-dimensional cube (e.g., the Impact Cube 580 and/or the Metric Cube 590). To update the analyzed Causal Package, the skeleton model engine 565 may provide the outputs to the learning engine 520.

In one embodiment, the computing system may not allow a metric to affect other metrics at higher or lower levels of its hierarchical tree except through an aggregation (e.g. customer satisfaction in USA cannot affect sales in North America except through its influence on sales in USA).

A user can utilize a multi-dimensional hierarchical data structure with at least two different modeling purposes: (1) To aggregate data (metrics) to a level of the multi-dimensional hierarchical data structure at which statistically significant relationships among metrics can be identified, e.g., by calculating a statistical significance of a relationship. (If "P" refers to an estimate of a probability that an event has occurred, "1-P" indicates a value of a statistical significance); (2) To segment the data across different nodes of a hierarchical level to enable localized modeling (e.g. modeling metrics for France and Italy separately or jointly). These two methods (i.e., aggregation and segmentation) may be orthogonal. A modeling may involve a combination of these two methods. For example, if the computing system chooses to aggregate the data at a (dynamically chosen) level, but does not segment the data at all, then the computing system imposes no edge constraints on the data. If the computing system chooses to segment and to aggregate the data at a level of a dimension, the computing system imposes constraints on relationships among metrics so as not to cross nodes (i.e., relationships are limited in a same node) in the level while performing modeling according to method steps illustrated in FIG. 1. If the computing system chooses to segment the data at a level of a dimension but does not aggregate the data at all, then the computing system imposes constraints on relationships among metrics so as not to cross nodes in the level, while modeling using non-aggregated data at the leaf nodes of the multi-dimensional hierarchies.

In one embodiment, the computing system imposes edge constraints so that variables from different nodes cannot interact with one another, as illustrated in local and independent models illustrated FIGS. 9a-9b. In another embodiment, the computing system imposes constraints on a model for each node, allowing a causal strength (e.g., a statistical significance, etc.) to vary across sibling models (i.e., models having same hierarchical structure but different relationships between metrics in nodes). In one embodiment, the computing system imposes edge constraints so that certain metrics are not allowed (or forced) to impact other particular metrics.

In one embodiment, the computing system uses historical data (i.e., data stored in a database) to discover relationships among metrics, e.g., by calculating predictive mean square errors of each metric. In another embodiment, the computing system obtains an expert opinion to discover relationship among metrics. The computing system validates those metrics/metric relationships that have the strongest impact on business objectives, directly or indirectly, e.g., by calculating a statistical significance of each relationship.

In one embodiment, the computing system discovers implicit metric relationships at levels of a dimension based on a combination of dimensional aggregation rules (e.g., an aggregation 1025 illustrated in FIG. 10) and explicit relationships between metrics. For example, as illustrated in FIG. 10, the computing system discovers an implicit model 1000 from an explicit model 1005, e.g., by the aggregation 1025.

In one embodiment, the computing system discovers metrics at a particular level of a dimension that most affects organization performance at a particular time period, e.g., by performing data mining at a frontier of the dimension. The computing system aggregates those metrics to a higher level of the dimension to assess their impact at the higher level of the organization.

In one embodiment, the computing system determine an amount of changes in metrics in order to achieve planning targets, e.g., by performing method steps illustrated in FIG. 4. In one embodiment, the computing system assesses a future impact of the changes to metric values, e.g., by performing method steps illustrated in FIG. 2.

Figure 8:
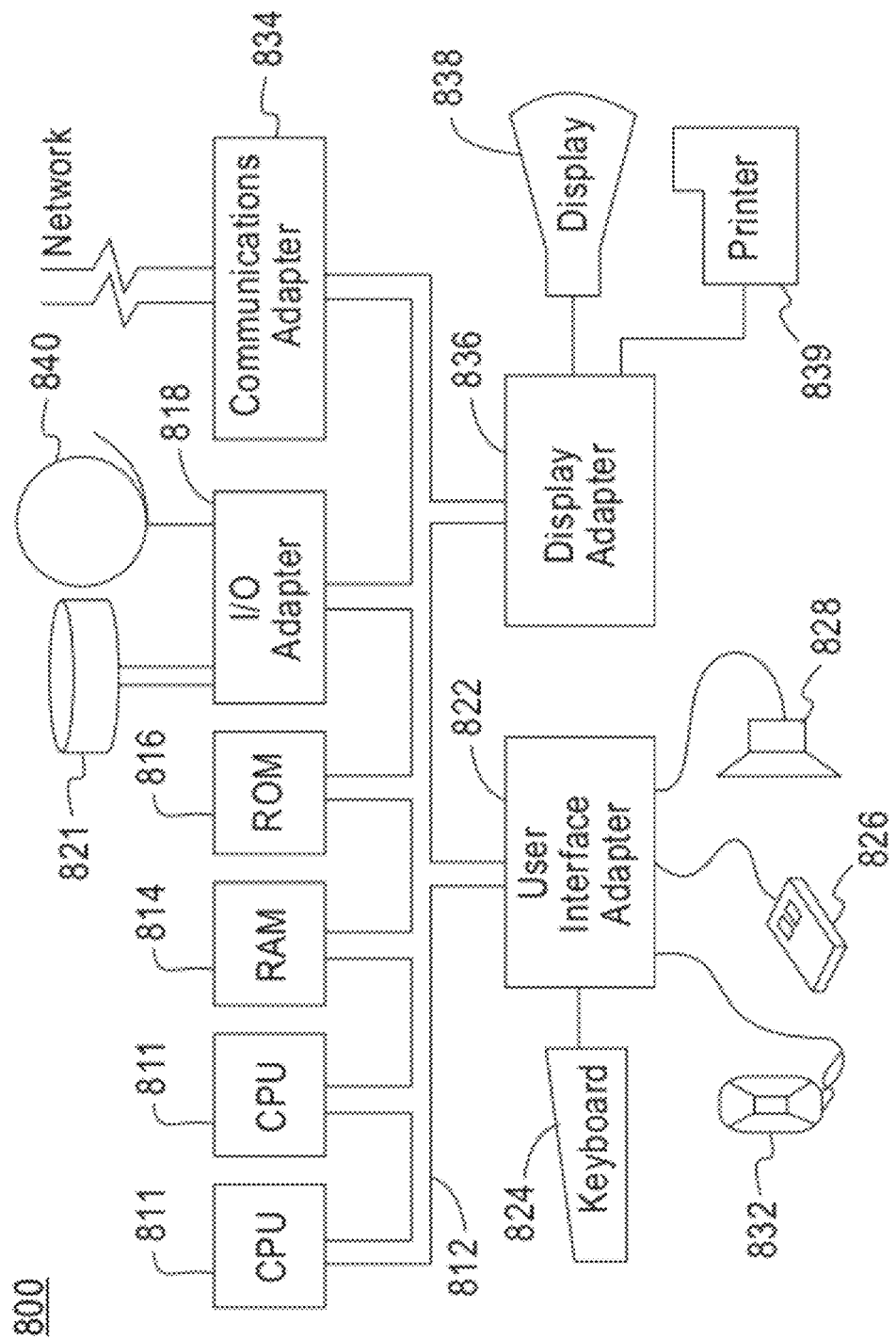
FIG. 8 illustrates an exemplary hardware configuration for implementing the flow chart depicted in FIG. 1 according to one embodiment.

FIG. 8 illustrates an exemplary hardware configuration of a computing system 800 running and/or implementing the method steps in FIG. 8. The hardware configuration preferably has at least one processor or central processing unit (CPU) 811. The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting the system 800 to a data processing network, the Internet, an Intranet, a local area network (LAN), etc., and a display adapter 836 for connecting the bus 812 to a display device 838 and/or printer 839 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for constructing and using a causal graphical analysis tool, the method comprising:

storing, in a database accessible by a computer system, multidimensional data representing metrics related to an organization, the metrics being used by the computer system to perform prediction analysis on events associated with the organization;

constructing, by a processor of the computer system, from said multidimensional data, a causal graphical model representing a multidimensional hierarchical data structure, the multidimensional hierarchical data structure including one or more dimensions, each dimension having a plurality of nodes hierarchically arranged into a number of levels, each node having associated metric data, and including edges between nodes, each edge representing a directed relationship between metrics of connected nodes;

said causal graphical model constructing comprising:

acquiring, by the processor, first data corresponding to a first frontier representing a cut at a dimension level of the multi-dimensional hierarchical data structure, said first data being aggregated and segmented along each of the multiple dimensions;

performing, by the processor, modeling on the first data to obtain a first model and a corresponding first statistic, the performing the modeling including:

receiving, by the processor, input historical time series data $\{X_t\}_{t=1,\ldots,M}$, where each $X_t$ is a p-dimensional vector, M and p are integer numbers;

receiving, via a user interface, specification of one or more metrics constraints, one or more dimensional constraints or both metrics constraints and dimensional constraints to control construction of said causal graphical network;

setting a graph G to (V, E), where the V is a set of p features, and the E is a set of edges between the features;

for each feature y, which belongs to the set V, running a regression on every y in terms of past lagged variables, $X_{t-d}, \ldots, X_{t-1}$, for all features x, which belongs to the set V;

for each feature x, which belongs to the set V, placing an edge directed from the x to they into set E if x is selected as a group by the regression; and iterating through said multi-dimensional hierarchical data structure to further expand a frontier dimension of the first frontier to obtain a new frontier level, wherein at each iteration:

gathering, by the processor, further data corresponding to the expanded new frontier level, said further data being aggregated and segmented along each of the multiple dimensions;

applying, by the processor, the data modeling on the further data to obtain a further model and a corresponding further statistic;

comparing, by the processor, the first statistic of the first model and the further statistic of the further model;

setting, by the processor, the further model to be the causal graphical model and setting the new frontier level to be the first frontier in response to determining that the further statistic improves the first model statistic;

repeating, by the processor, the iterating and new frontier level expanding until there are no new frontier dimensions to further expand;

outputting, by the processor, the causal graphical model as structured data providing an expanded frontier level of statistically significant metric relationships and learned impacts between metric measures for conducting a causal analysis;

predicting, by the processor, future values of metrics of the causal graphical model based on an inference using the first data and the metrics of the causal graphical model;

identifying, by the processor, a main metric that includes predicted future values that deviates away from a mean of the main metric with respect to time;

determining, by the processor, a causal relationship between each metric of the causal graphical model and the main metric based on a comparison of each metric of the causal graphical model with the main metric, wherein each causal relationship indicates an effect of the main metric on a deviation distance between the metric of the causal graphical model with a respective desired value;

identifying, by the processor, a set of candidate metrics from the metrics of the causal graphical model, wherein each candidate metrics corresponds to a deviation distance below a threshold;

determining, by the processor, causal relations and associated measures of strengths at the expanded frontier level in the outputted structured data by calculating a causal strength, per each candidate relation between each candidate metric and the main metric, or a pair of metrics in the cut in the frontier, as a weighted sum of causal strengths of causal relations whose dimension nodes are equal or descendents of the each candidate relation, wherein each weighted sum is a result of an application of a weight on a candidate metric, and each weight is determined by a ratio between a value of a target metric at the first frontier and an aggregated value of target metrics at the first frontier;

receiving, by the processor and via the user interface, a request for a prediction analysis on a first candidate relation associated with a first candidate metric and a second candidate relation associated with a second candidate metric;

aggregating, by the processor, a first causal strength of the first relation and a second causal strength of the second relation, wherein the first causal strength is a first weighted sum of the first candidate metric, the second causal strength is a second weighted sum of the second candidate metric, and aggregating the first causal strength and the second causal strength instead of the first candidate metric and the second candidate metric provides an indication of a predicted effect on an event caused by activities associated with the first candidate relation and the second candidate relation instead of effects on the event caused by the first candidate metric and the second candidate metric; and outputting, by the processor, the aggregated causal strengths on the user interface.

2. The method according to claim 1, wherein the modeling includes one or more of: probabilistic graphical modeling, least squares estimation, graphical Granger modeling method, and generalized linear modeling method.

3. The method according to claim 1, wherein the acquiring the first data includes one or more of:
aggregating data corresponding to nodes in a dimension of the multi-dimensional hierarchical data structure; or
constructing a separate model corresponding to distinct nodes in one or more dimensions of the mutli-dimensional hierarchical data structure.

4. The method according to claim 1, wherein the comparing includes:
calculating, as the first and further statistics that represent statistical values, respective statistical significances of the first model and the further model, and comparing the calculated statistical significances, wherein the further model is set to be the first model in response to determining that the further model statistic is higher than the first model statistic.

5. The method according to claim 1, wherein the comparing includes:
calculating, as the first and further statistics that represent statistical values, respective predictive squared error means of the first model and the further model, and comparing the calculated predictive squared error means.

6. The method according to claim 1, wherein predicting the future values comprises:
setting values of a set of metrics in the outputted first model to new values;
allocating or aggregating the first data to obtain the second data;
performing prediction on the values of metrics by using the outputted first model and set values; and
allocating or aggregating predicted values at a level lower or higher than the new frontier.

7. The method according to claim 6, wherein identifying the main metric comprises:
performing a prediction according to which some of the metrics in the multi-dimensional data structure are changed towards mean values of the some of the metrics;
examining an effect of the changes in the values of the metrics; and
determining which metric at a particular time is to be attributed as the main metric by identifying which metrics result in bringing back the value of the metrics to normal value range with minimal changes to the values.

8. The method according to claim 6,
wherein identifying the set of candidate metrics comprises:
performing a prediction, in which metrics in the data structure are changed in a direction suggested by the output model;
examining the effect of said changes to the values of the candidate metrics; and
determining which metric in the data structure is projected to achieve the desired value of the target metric, with minimal changes to the values of the candidate metrics.

9. The method according to claim 1, wherein the plurality of nodes in the first hierarchical data structure represent geographical areas, the plurality of nodes in the second hierarchical data structure represent products.

10. The method according to claim 1, wherein the structured data includes at least two different dimensions: a measure dimension and an impact attribute dimension, the measure dimension includes: receivable, total revenue, total expenses, the impact attribute dimension includes: a source cube, a source dimension, a source measure, a source node, a target node, a most important lag, a function, a coefficient, a user defined indication, the source cube, the source dimension and the source measure refer to sources of the identified at least one causal relation, the source node refers to a dimension associated with measures of the sources.

11. The method according to claim 1, wherein the determining the strength of the identified at least one causal relation uses L1 norm or L2 norm, which defines a quantity of a characteristic of the identified at least one causal relation.

12. The method according to claim 1, further comprising:
identifying at least one causal relation in the outputted first model, the identified at least one relation defining a degree that a combination of a first node in the first hierarchical data structure and a second node in the second hierarchical data structure affects another combination of a third node in the first hierarchical data structure and a fourth node in the second hierarchical data structure;
determining strength of the identified at least one causal relation; and
transforming the identified at least one causal relation and the determined strength into an impact cube, the impact cube including: a time lag, the identified at least one casual relation, the determined strength, the time lag indicating an amount of time that the another combination becomes affected based on the determined strength of the identified at least one causal relation.

13. The method according to claim 1, wherein said metric constraints comprise one or more selected from the group consisting of: forcing or prohibiting a metric to be a source or target metric in a graphical model; forcing or prohibiting a source metric impacting a target metric; forcing or prohibiting a metric having an attribute to be a source or target; and forcing or prohibiting a source metric having an attribute that impacts a target metric having an attribute.

14. The method according to claim 1, wherein said dimension constraints comprises: disallowing a metric to impact metrics at different nodes in a specified dimension.

15. A computer-implemented causal graphical analysis system comprising:
a memory device accessible by a computer system, for storing multidimensional data representing metrics related to an organization, the metrics being used by the computer system to perform prediction analysis on events associated with the organization; and
a processor being connected to the memory device, wherein the processor is configured to implement a learning engine to:
construct, from said multidimensional data, a causal graphical model representing a multidimensional hierarchical data structure, the multidimensional hierarchical data structure including multiple dimensions, each dimension having a plurality of nodes hierarchically arranged into a number of levels, each node having associated metric data, and including edges between nodes, each edge representing a directed relationship between metrics of connected nodes;

wherein construction of the causal graphical model comprises:

acquire first data corresponding to a first frontier representing a cut at a dimension level of the multi-dimensional hierarchical data structure, said first data being aggregated and segmented along each of the multiple dimensions;

perform modeling on the first data to obtain a first model and a corresponding first statistic, the performing the modeling including:

receive historical input time series data $\{X_t\}_{t=1,\ldots,M}$, where each $X_t$ is a p-dimensional vector, M and p are integer numbers;

receive, via a user interface, specification of one or more metrics constraints, one or more dimensional constraints or both metrics constraints and dimensional constraints to control construction of said causal graphical network;

set a graph G to (V, E), where the V is a set of p features, and the E is a set of edges between the features;

for each feature y, which belongs to the set V, run a regression on every y in terms of past lagged variables, $X_{t-d}, \ldots, X_{t-1}$, for all features x, which belongs to the set V;

for each feature x, which belongs to the set V, place an edge directed from the x to the y if x is selected as a group by the regression; and iterate through said multi-dimensional hierarchical data structure to further expand a frontier dimension of the first frontier to obtain a new frontier level, wherein at each iteration, the learning engine is further configured to:

gather further data corresponding to the expanded new frontier level, said further data being aggregated and segmented along each of the multiple dimensions;

apply the data modeling on the further data to obtain a further model and a corresponding further statistic;

compare the first statistic of the first model and the further statistic of the further model;

set the further model to be the causal graphical model and setting the new frontier level to the first frontier in response to determining that the further statistic improves the first model statistic;

output the causal graphical model as structured data providing an expanded frontier level of statistically significant metric relationships and learned impacts between metric measures for conducting a causal analysis;

predict future values of metrics of the causal graphical model based on an inference using the first data and the metrics of the causal graphical model;

identify a main metric that includes predicted future values that deviates away from a mean of the main metric with respect to time;

determine a causal relationship between each metric of the causal graphical model and the main metric based on a comparison of each metric of the causal graphical model with the main metric, wherein each causal relationship indicates an effect of the main metric on a deviation distance between the metric of the causal graphical model with a respective desired value;

identify a set of candidate metrics from the metrics of the causal graphical model, wherein each candidate metrics corresponds to a deviation distance below a threshold;

determine causal relations and associated measures of strengths at the expanded frontier level in the outputted structured data by calculating a causal strength, per each candidate relation between each candidate metric and the main metric, or a pair of metrics in the cut in the frontier, as a weighted sum of causal strengths of causal relations whose dimension nodes are equal or descendents of the each candidate relation, wherein each weighted sum is a result of an application of a weight on a candidate metric, and each weight is determined by a ratio between a value of a target metric at the first frontier and an aggregated value of target metrics at the first frontier;

receive, via the user interface, a request for a prediction analysis on a first candidate relation associated with a first candidate metric and a second candidate relation associated with a second candidate metric;

aggregate a first causal strength of the first relation and a second causal strength of the second relation, wherein the first causal strength is a first weighted sum of the first candidate metric, the second causal strength is a second weighted sum of the second candidate metric, and aggregating the first causal strength and the second causal strength instead of the first candidate metric and the second candidate metric provides an indication of a predicted effect on an event caused by activities associated with the first candidate relation and the second candidate relation instead of effects on the event caused by the first candidate metric and the second candidate metric; and output the aggregated causal strengths on the user interface.

16. The system according to claim 15, wherein the modeling includes one or more of: probabilistic graphical modeling, least squares estimation, graphical Granger modeling method, and generalized linear modeling.

17. The system according to claim 15, wherein the acquiring the first data includes one or more of:

aggregating data corresponding to nodes in a dimension of the multi-dimensional hierarchical data structure; or constructing a separate model corresponding to distinct nodes in one or more of the multi-dimensional hierarchical data structure.

18. The system according to claim 15, wherein the comparing includes:

calculating, as the first and further statistics that represent statistical values, respective statistical significances of the first model and the further model, and comparing the calculated statistical significances, wherein the further model is set to be the first model in response to determining that the further model statistic is higher than the first model statistic.

19. The system according to claim 15, wherein the comparing includes:

calculating, as the first and further statistics that represent statistical values, respective predictive squared error means of the first model and the further model, and comparing the calculated predictive squared error means.

20. The system according to claim 15, prediction of the future values comprises:
setting values of a set of metrics in the outputted first model to new values;
allocating or aggregating the first data to obtain the second data;
performing prediction on the values of metrics by using the outputted first model and the set values; and
allocating or aggregating predicted values at a level lower or higher than the new frontier.

21. The system according to claim 20, wherein identification of the main metric comprises:
performing a prediction according to which some of the metrics in the multi-dimensional data structure are changed towards mean values of the some of the metrics;
examining an effect of the changes in the values of the metrics; and
determining which metric at a particular time is to be attributed as the main metric by identifying which metrics result in bringing back the value of the metrics to normal value range with minimal changes to the values.

22. The system according to claim 21,
wherein identification of the set of candidate metrics comprises:
performing a prediction, in which metrics in the data structure are changed in a direction suggested by the output model;
examining the effect of said changes to the values of the candidate metrics; and
determining which metric in the data structure is projected to achieve the desired value of the target metric, with minimal changes to the values of the candidate metrics.

23. A computer program product for a causal graphical analysis tool, the computer program product comprising a non-transitory storage medium readable by a processing circuit and storing instructions run by the processing circuit for performing a method, the method comprising:
storing, in a database accessible by a computer system, multidimensional data representing metrics related to an organization, the metrics being used by the computer system to perform prediction analysis on events associated with the organization;
constructing, by a learning engine implemented on a processor at said computer system, from said multidimensional data, a causal graphical model representing a multidimensional hierarchical data structure, the multidimensional hierarchical data structure including multiple dimensions, each dimension having a plurality of nodes hierarchically arranged into a number of levels, each node having associated metric data, and including edges between nodes, each edge representing a directed relationship between metrics of connected nodes;
said causal graphical model constructing comprising:
acquiring, by the learning engine, first data corresponding to a first frontier representing a cut at a dimension level of the multi-dimensional hierarchical data structure, said first data being aggregated and segmented along each of the multiple dimensions;
performing, by the learning engine, data modeling on the first data to obtain a first model and a corresponding first statistic, the performing the modeling including:
receiving historical input time series data $\{X_t\}_{t=1,\ldots,M}$, where each $X_t$ is a p-dimensional vector, M and p are integer numbers;
receiving, via a user interface, specification of one or more metrics constraints, one or more dimensional constraints or both metrics constraints and dimensional constraints to control construction of said causal graphical network;
setting a graph G to (V, E), where the V is a set of p features, and the E is a set of edges between the features;
for each feature y, which belongs to the set V, running a regression on every y in terms of past lagged variables, $X_{t-d}, \ldots, X_{t-1}$, for all features x, which belongs to the set V;
for each feature x, which belongs to the set V, placing an edge directed from the x to the y if x is selected as a group by the regression; and
iterating through said multi-dimensional hierarchical data structure to further expand a frontier dimension of the first frontier to obtain a new frontier level, wherein at each iteration, said processing circuit performs:
gathering, by the learning engine, further data corresponding to the expanded new frontier level, said further data being aggregated and segmented along each of the multiple dimensions;
applying, by the learning engine, the modeling on the further data to obtain a further model and a corresponding further statistic;
comparing, by the learning engine, the first statistic of the first model and the further statistic of the further model;
setting, by the learning engine, the further model to be the causal graphical model and setting the new frontier level to the first frontier in response to determining that the further statistic is better than the first model statistic;
outputting, by the learning engine, the causal graphical model as structured data representing an expanded frontier level of statistically significant metric relationships and learned impacts between metric measures for conducting a causal analysis;
predicting, by the processor, future values of metrics of the causal graphical model based on an inference using the first data and the metrics of the causal graphical model;
identifying, by the processor, a main metric that includes predicted future values that deviates away from a mean of the main metric with respect to time;
determining, by the processor, a causal relationship between each metric of the causal graphical model and the main metric based on a comparison of each metric of the causal graphical model with the main metric, wherein each causal relationship indicates an effect of the main metric on a deviation distance between the metric of the causal graphical model with a respective desired value;
identifying, by the processor, a set of candidate metrics from the metrics of the causal graphical model, wherein each candidate metrics corresponds to a deviation distance below a threshold;
determining, by the learning engine, causal relations and associated measures of strengths in the expanded frontier level in the outputted structured data by calculating a causal strength, per each candidate relation between each candidate metric and the main metric, or a pair of metrics in the cut in the frontier, as a weighted sum of causal strengths of causal relations whose dimension nodes are equal or descendents of the each candidate relation, wherein each weighted sum is a result of an application of a weight on a candidate metric, and each weight is determined by a ratio between a value of a target metric at the first frontier and an aggregated value of target metrics at the first frontier;

receiving, by the processor and via the user interface, a request for a prediction analysis on a first candidate relation associated with a first candidate metric and a second candidate relation associated with a second candidate metric;

aggregating, by the processor, a first causal strength of the first relation and a second causal strength of the second relation, wherein the first causal strength is a first weighted sum of the first candidate metric, the second causal strength is a second weighted sum of the second candidate metric, and aggregating the first causal strength and the second causal strength instead of the first candidate metric and the second candidate metric provides an indication of a predicted effect on an event caused by activities associated with the first candidate relation and the second candidate relation instead of effects on the event caused by the first candidate metric and the second candidate metric; and outputting, by the processor, the aggregated causal strengths on the user interface.

24. The computer program product according to claim 23, wherein the comparing includes:

calculating, as the first and further statistics that represent statistical values, respective statistical significances of the first model and the further model, and comparing the calculated statistical significances, wherein the further model is set to be the first model in response to determining that the further model statistic is higher than the first model statistic.

* * * * *